United States Patent
Lu et al.

(10) Patent No.: US 11,297,565 B2
(45) Date of Patent: Apr. 5, 2022

(54) COMMUNICATION METHOD AND TERMINAL DEVICE

(71) Applicant: HUAWEI TECHNOLOGIES CO., LTD., Guangdong (CN)

(72) Inventors: Zhenwei Lu, Beijing (CN); Yi Shi, Beijing (CN); Deping Liu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 14 days.

(21) Appl. No.: 16/875,028

(22) Filed: May 15, 2020

(65) Prior Publication Data
US 2020/0280915 A1 Sep. 3, 2020

Related U.S. Application Data

(63) Continuation of application No. PCT/CN2017/111414, filed on Nov. 16, 2017.

(51) Int. Cl.
*H04W 48/20* (2009.01)
*H04L 5/16* (2006.01)
(Continued)

(52) U.S. Cl.
CPC .............. *H04W 48/20* (2013.01); *H04L 5/16* (2013.01); *H04W 36/12* (2013.01); *H04W 72/0446* (2013.01)

(58) Field of Classification Search
CPC . H04W 48/20; H04W 36/12; H04W 72/0446; H04L 5/16
See application file for complete search history.

(56) References Cited

U.S. PATENT DOCUMENTS

2013/0301590 A1   11/2013   Shi
2017/0238321 A1   8/2017   Sartori et al.
(Continued)

FOREIGN PATENT DOCUMENTS

CN   102308640 A   1/2012
CN   102308641 A   1/2012
(Continued)

OTHER PUBLICATIONS

Huawei, HiSilicon, Discussion on sensing and resource (re)selection for carrier aggregation. 3GPP TSG RAN WG1 Meeting #90bis, Prague, Czech Republic, Oct. 9-13, 2017, R1-1717002, 4 pages.
(Continued)

*Primary Examiner* — Jeffrey M Rutkowski
*Assistant Examiner* — Chae S Lee
(74) *Attorney, Agent, or Firm* — Womble Bond Dickinson (US) LLP

(57) ABSTRACT

This application provides a communication method and a terminal device. The communication method may include determining, by user equipment (UE), a candidate resource set on a first carrier, where the first carrier is a carrier on which a resource is currently to be selected, and the first carrier is used to transmit first data. The method may also include selecting, by the UE, a resource on the first carrier from the candidate resource set based on a preset condition, where the preset condition is determined based on resources selected by the UE on other carriers and one or more of the following: a quantity of transmit chains of the UE, a transmit power of the UE, a quantity of resource blocks occupied by the UE, a frequency domain spacing between a plurality of carriers or a plurality of frequency domain resources occupied by the UE, a carrier switching time of the UE, and a half-duplex limitation to the UE, the other carriers indicate all carriers on which the UE has currently selected a
(Continued)

UE determines a candidate resource set on a first carrier, where the first carrier is a carrier on which a resource is currently to be selected, and the first carrier is used to transmit first data — 210

The UE selects a resource on the first carrier from the candidate resource set based on a preset condition, where the preset condition is determined based on resources selected by the UE on other carriers and one or more of the following of the UE: a quantity of transmit chains of the UE, a transmit power of the UE, a quantity of resource blocks occupied by the UE, a frequency domain spacing between a plurality of carriers or a plurality of frequency domain resources occupied by the UE, a carrier switching time of the UE, and a half-duplex limitation to the UE, and the other carriers indicate all carriers on which the UE has currently selected a resource — 220

The UE sends the first data on the resource selected on the first carrier — 230 resource, and the other carriers are used to transmit second data. The method may also include sending, by the UE, the first data on the resource selected on the first carrier.

16 Claims, 6 Drawing Sheets

(51) Int. Cl.
*H04W 36/12* (2009.01)
*H04W 72/04* (2009.01)

(56) References Cited

U.S. PATENT DOCUMENTS

2020/0288473 A1* 9/2020 Li ............................. H04L 5/00
2020/0296690 A1* 9/2020 Lee ........................ H04W 4/40

FOREIGN PATENT DOCUMENTS

| CN | 102340824 A | 2/2012 |
| CN | 103874073 A | 6/2014 |
| CN | 106470485 A | 3/2017 |
| CN | 107006000 A | 8/2017 |
| EP | 3478005 A1 | 5/2019 |
| WO | 2017171519 A1 | 10/2017 |

OTHER PUBLICATIONS

Intel Corporation, Sidelink Carrier Aggregation for Mode-4 LTE V2V Communication. 3GPP TSG RAN WG1 Meeting #90bis, Prague, Czech Republic Oct. 9-13, 2017, R1-1717330, 8 pages.

Samsung, Mode-4 support in V2X CA. 3GPP TSG RAN WG1 #90bis, Prague, Czech Republic, Oct. 9-13, 2017, R1-1717553, 6 pages.

3GPP TSG RAN WG1 Meeting 90bis,R1-1717415,Resource selection for V2X systems supporting CA,ASTRI, TCL Communication Ltd.,Prague, CZ, Oct. 9-13, 2017,total 5 pages.

3GPP TSG RAN1 WG Meeting #88bis,R1-1705446,On Carrier Aggregation for LTE V2V Sidelink Communication,Intel Corporation,Spokane, USA, Apr. 3-7, 2017,total 9 pages.

* cited by examiner

COMMUNICATION METHOD AND TERMINAL DEVICE

CROSS-REFERENCE TO RELATED APPLICATIONS

This application is a continuation of International Application No. PCT/CN2017/111414, filed on Nov. 16, 2017, the disclosure of which is hereby incorporated by reference in its entirety.

TECHNICAL FIELD

This application relates to the communications field, and more specifically, to a communication method and a terminal device.

BACKGROUND

A V2X (Vehicle to X) technology is a key technology of an intelligent transportation system in the future. In the V2X technology, a vehicle can communicate with a vehicle, a base station, or another device.

Resources may be used in the V2X technology in two modes. In a mode 3, a base station allocates, to each user equipment (UE) (for example, a vehicle) on a sidelink, a time-frequency resource used by the UE to transmit control information and data. In a mode 4, UE independently selects a resource from a resource pool, and the UE selects, based on resource information previously sensed by the UE, some relatively idle resources to transmit control information and data.

In the $3^{rd}$ Generation Partnership (3GPP) Project Technical Specification Group's Release 14 (Rel.14), for a Rel.14 V2X technology, when the UE has newly arrived data in the mode 4, the UE needs to select a resource to send the data, or because of triggering by some conditions, the UE needs to perform resource reselection for a selected resource. The UE determines a candidate resource set based on resource information sensed by the UE, and then randomly selects a resource from the candidate resource set.

In Rel.15 (e.g. Release 15), a scenario that the UE may need to send data on a plurality of carriers is further considered. If the foregoing technical solution is still used, a resource is independently selected on each carrier, and some problems may occur. For example, the UE may select a same time domain resource to send data on different carriers, but an amount of data to be sent at the same time may be greater than a quantity of transmit chains of the UE. In this case, some data cannot be sent. Consequently, system performance is adversely affected, data transmission reliability is reduced, and further, safety of a vehicle is compromised. For another example, when the UE sends data on a same time domain resource on different carriers, a sum of transmit powers of the data may be greater than a maximum transmit power of the UE. In this case, it is the only way to discard and not send some data or reduce transmit powers of some data. Consequently, system performance is degraded, and data transmission security is compromised. For another example, in a multi-carrier scenario, the UE is allowed to select different time domain resources to send data on different carriers. Because of a half-duplex limitation, the UE cannot receive data while sending data. Therefore, the UE cannot receive more data in the multi-carrier scenario than in a single-carrier scenario, adversely affecting system performance and compromising data transmission security.

In conclusion, a resource selection solution applicable to the multi-carrier scenario needs to be urgently proposed.

SUMMARY

This application provides a resource selection solution applicable to a multi-carrier scenario, to overcome problems where a large amount of data is discarded because a limited resource is selected.

According to a first aspect, a communication method is provided. The communication method includes: determining, by user equipment UE, a candidate resource set on a first carrier, where the first carrier is a carrier on which a resource is currently to be selected, and the first carrier is used to transmit first data; selecting, by the UE, a resource on the first carrier from the candidate resource set based on a preset condition, where the preset condition is determined based on selected resources of the UE on other carriers and one or more of the following information of the UE: a quantity of transmit chains of the UE, a transmit power of the UE, a quantity of resource blocks occupied by the UE, a frequency domain spacing between a plurality of carriers or a plurality of frequency domain resources occupied by the UE, a carrier switching time of the UE, and a half-duplex limitation to the UE, the other carriers indicate all carriers on which the UE has currently selected a resource, and the other carriers are used to transmit second data; and sending, by the UE, the first data on the resource selected on the first carrier.

In this application, the resource is selected on the first carrier based on the selected resources on the other carriers and one or more of the following information of the UE: the quantity of transmit chains, the transmit power, the quantity of occupied resource blocks, the frequency domain spacing between the occupied plurality of carriers or the occupied plurality of frequency domain resources, the carrier switching time, or the half-duplex limitation, so that the following can be achieved to some extent: on the resource selected on the first carrier, sending data by the UE on a same time domain resource falls within a sending capability of the UE, and/or the UE can keep as many time domain resources as possible to receive data, to overcome the half-duplex limitation to the UE. Therefore, in this application, in a multi-carrier scenario, a resource on a current carrier is selected based on selected resources and another constraint condition, so that a large amount of data can be prevented from being discarded because a limited resource is selected, thereby improving data transmission reliability to some extent and further improving safety of a vehicle.

With reference to the first aspect, in a possible embodiment of the first aspect, the preset condition includes a first preset condition; and the selecting, by the UE, a resource on the first carrier from the candidate resource set based on a preset condition includes: determining, by the UE, a first candidate resource subset from the candidate resource set, where the first candidate resource subset does not include a first candidate resource that meets the first preset condition; and selecting, by the UE, a resource on the first carrier from the first candidate resource subset, where that the first candidate resource meets the first preset condition indicates that there is an intersection between a time domain resource of the first candidate resource and a time domain resource of a first selected resource in the selected resources, and the first selected resource meets a condition determined based on one or more of the following information of the UE: the quantity of transmit chains of the UE, the transmit power of the UE, the quantity of resource blocks occupied by the UE, and the frequency domain spacing between the plurality of carriers or the plurality of frequency domain resources occupied by the UE; and/or that the first candidate resource meets the first preset condition indicates that there is no intersection between the time domain resource of the first candidate resource and a time domain resource of a second selected resource in the selected resources, and a time domain spacing between the first candidate resource and the second selected resource meets a condition determined based on the carrier switching time of the UE.

In this embodiment of this application, in the multi-carrier sending scenario, the UE selects a resource on a carrier based on selected resources on other carriers and a sending capability of the UE, so that the selected resource can meet a constraint condition related to the sending capability of the UE, thereby improving data transmission reliability to some extent and further improving safety of a vehicle.

Optionally, the first candidate resource may be one resource, or may be a plurality of resources.

Optionally, in an embodiment, a method used by the UE to determine the first candidate resource subset includes: for each time domain resource in the candidate resource set, excluding, by the UE, all candidate resources on one time domain resource from the candidate resource set once the one time domain resource meets the first preset condition, to determine the first candidate resource subset, where that the one time domain resource meets the first preset condition indicates that there is an intersection between the one time domain resource and the time domain resource of the first selected resource in the selected resources, and the first selected resource meets the condition determined based on one or more of the following information of the UE: the quantity of transmit chains of the UE, the transmit power of the UE, the quantity of resource blocks occupied by the UE, and the frequency domain spacing between the plurality of carriers or the plurality of frequency domain resources occupied by the UE; and/or that the one time domain resource meets the first preset condition indicates that there is no intersection between the one time domain resource and the time domain resource of the second selected resource in the selected resources, and the time domain spacing between the first candidate resource and the second selected resource meets the condition determined based on the carrier switching time of the UE.

Optionally, in another embodiment, a method used by the UE to determine the first candidate resource subset includes: for each candidate resource in the candidate resource set, excluding, by the UE, one candidate resource from the candidate resource set once the one candidate resource meets the first preset condition, to determine the first candidate resource subset. That the one candidate resource meets the first preset condition indicates that there is an intersection between a time domain resource of the one candidate resource and the time domain resource of the first selected resource in the selected resources, and the first selected resource meets the condition determined based on one or more of the following information of the UE: the quantity of transmit chains of the UE, the transmit power of the UE, the quantity of resource blocks occupied by the UE, and the frequency domain spacing between the plurality of carriers or the plurality of frequency domain resources occupied by the UE; and/or that the one candidate resource meets the first preset condition indicates that there is no intersection between a time domain resource of the one candidate resource and the time domain resource of the second selected resource in the selected resources, and the time domain spacing between the first candidate resource and the second selected resource meets the condition determined based on the carrier switching time of the UE.

With reference to the first aspect, in a possible embodiment of the first aspect, the first preset condition specifically includes: there is an intersection between the time domain resource of the first candidate resource and the time domain resource of the first selected resource in the selected resources; and a quantity of carriers corresponding to the first selected resource is greater than or equal to a first threshold; or a sum of a quantity of carriers corresponding to the first selected resource and a quantity of carriers corresponding to a currently selected resource is greater than or equal to a second threshold; or a quantity of frequency bands corresponding to the first selected resource is greater than or equal to a third threshold; or a sum of a quantity of frequency bands corresponding to the first selected resource and a quantity of frequency bands corresponding to a currently selected resource is greater than or equal to a fourth threshold; or an amount of to-be-sent data on the first selected resource is greater than or equal to a fifth threshold; or a sum of an amount of to-be-sent data on the first selected resource and an amount of to-be-sent data on a currently selected resource is greater than or equal to a sixth threshold.

Optionally, the first threshold, the second threshold, the second threshold, the fourth threshold, the fifth threshold, or the sixth threshold may be determined based on a maximum value of the quantity of transmit chains of the UE, or may be a preset threshold.

For example, the first threshold, the third threshold, or the fifth threshold is the maximum value of the quantity of transmit chains of the UE. For another example, the second threshold, the fourth threshold, or the sixth threshold is a preset threshold, and the preset threshold is greater than the maximum value of the quantity of transmit chains of the UE.

Optionally, the first threshold, the second threshold, the third threshold, the fourth threshold, the fifth threshold, or the sixth threshold in this embodiment is preconfigured on the UE, or is obtained by the UE from a network device (for example, a base station) by using any one of the following signaling: radio resource control (Radio Resource Control, RRC) dedicated signaling, a system message, MAC layer signaling, or physical layer signaling.

In this embodiment, a resource that meets a limitation of the quantity of transmit chains is excluded from the candidate resource set on the first carrier, and in this case, after the UE selects a resource, a case does not occur in which some data cannot be sent because of the limitation of the quantity of transmit chains, thereby improving data transmission reliability and further improving safety of a vehicle.

With reference to the first aspect, in a possible embodiment of the first aspect, the first preset condition specifically includes: there is an intersection between the time domain resource of the first candidate resource and the time domain resource of the first selected resource in the selected resources; and a sum of a power of to-be-sent data on the first selected resource and a power of to-be-sent data on the first carrier is greater than or equal to a seventh threshold; or an absolute value of a difference between a power of to-be-sent data on at least one carrier corresponding to the first selected resource and a power of to-be-sent data on the first carrier is greater than or equal to an eighth threshold.

Optionally, the seventh threshold may be determined based on a maximum value of the transmit power of the UE, or may be a preset threshold.

For example, the seventh threshold is the maximum value of the transmit power of the UE.

Specifically, the eighth threshold may be determined based on a maximum difference between transmit powers at which the UE sends different data, or may be a preset threshold.

For example, the eighth threshold is the maximum difference between transmit powers at which the UE sends different data.

Optionally, the seventh threshold or the eighth threshold in this embodiment is preconfigured on the UE, or is obtained by the UE from a network device (for example, a base station) by using any one of the following signaling: RRC dedicated signaling, a system message, MAC layer signaling, or physical layer signaling.

In this embodiment, a resource with a transmit power limitation is excluded from the candidate resource set on the first carrier, and in this case, after the UE selects a resource, a case does not occur in which a large amount of data is discarded or a power is significantly reduced because the resource with the transmit power limitation is selected, thereby improving data transmission reliability and further improving safety of a vehicle.

With reference to the first aspect, in a possible embodiment of the first aspect, the first preset condition specifically includes: there is an intersection between the time domain resource of the first candidate resource and the time domain resource of the first selected resource in the selected resources; and a sum of a quantity of resource blocks occupied by to-be-sent data on the first selected resource and a quantity of resource blocks occupied by to-be-sent data on the first carrier is greater than or equal to a ninth threshold.

Optionally, the ninth threshold may be determined based on a maximum value of the quantity of resource blocks occupied by the UE, or may be a preset threshold.

For example, the ninth threshold is the maximum value of the quantity of resource blocks occupied by the UE.

Optionally, the ninth threshold in this embodiment is preconfigured on the UE, or is obtained by the UE from a network device (for example, a base station) by using any one of the following signaling: RRC dedicated signaling, a system message, MAC layer signaling, or physical layer signaling.

In this embodiment, a resource with a resource block quantity limitation is excluded from the candidate resource set on the first carrier, and in this case, after the UE selects a resource on the first carrier, a case does not occur in which a large amount of data is discarded or a power is significantly reduced because the resource with the resource block quantity limitation is selected, thereby improving data transmission reliability and further improving safety of a vehicle.

With reference to the first aspect, in a possible embodiment of the first aspect, the first preset condition specifically includes: there is an intersection between the time domain resource of the first candidate resource and the time domain resource of the first selected resource in the selected resources; and the first carrier and at least one carrier that corresponds to the first selected resource are non-adjacent carriers; or a frequency domain spacing between the first carrier and at least one carrier that corresponds to the first selected resource is greater than or equal to a tenth threshold; or the first carrier and at least one carrier that corresponds to the first selected resource are adjacent carriers, and a frequency domain spacing between the first candidate resource and a selected resource, on the at least one carrier, on the time domain resource of the first candidate resource is greater than or equal to an eleventh threshold, and/or the frequency domain spacing between the first candidate resource and the selected resource, on the at least one carrier, on the time domain resource of the first candidate resource is less than or equal to a twelfth threshold, where the eleventh threshold is less than the twelfth threshold.

Optionally, the tenth threshold, the eleventh threshold, or the twelfth threshold may be determined based on a limitation of the frequency domain spacing between the plurality of carriers or the plurality of frequency domain resources occupied by the UE, or may be a preset threshold.

Optionally, the tenth threshold, the eleventh threshold, or the twelfth threshold in this embodiment is preconfigured on the UE, or is obtained by the UE from a network device (for example, a base station) by using any one of the following signaling: RRC dedicated signaling, a system message, MAC layer signaling, or physical layer signaling.

In an optional embodiment, the first carrier and the at least one carrier that corresponds to the first selected resource are non-adjacent carriers, specifically indicating that the first carrier and each carrier that corresponds to the first selected resource are non-adjacent carriers. Alternatively, the frequency domain spacing between the first carrier and the at least one carrier that corresponds to the first selected resource is greater than or equal to the tenth threshold, specifically indicating that a frequency domain spacing between the first carrier and each carrier that corresponds to the first selected resource is greater than or equal to the tenth threshold.

In this embodiment, a resource on a non-adjacent carrier is excluded from the candidate resource set on the first carrier, and in this case, after the UE selects a resource on the first carrier, a case does not occur in which some data cannot be sent or performance is adversely affected, for example, interference is caused to another carrier, after some data is sent because the resource on the non-adjacent carrier is selected, thereby improving data transmission reliability and further improving safety of a vehicle.

With reference to the first aspect, in a possible embodiment of the first aspect, the first preset condition specifically includes: there is no intersection between the time domain resource of the first candidate resource and the time domain resource of the second selected resource in the selected resources; and when the time domain resource of the first candidate resource follows the time domain resource of the second selected resource, an interval between an end moment of the time domain resource of the second selected resource and a start moment of the time domain resource of the first candidate resource is less than or equal to a thirteenth threshold; or when the time domain resource of the first candidate resource precedes the time domain resource of the second selected resource, an interval between a start moment of the time domain resource of the second selected resource and an end moment of the time domain resource of the first candidate resource is less than or equal to a fourteenth threshold.

Optionally, the thirteenth threshold or the fourteenth threshold may be determined based on the carrier switching time of the UE, or may be a preset threshold.

For example, the thirteenth threshold or the fourteenth threshold is equal to the carrier switching time of the UE.

Optionally, the thirteenth threshold or the fourteenth threshold in this embodiment is preconfigured on the UE, or is obtained by the UE from a network device (for example, a base station) by using any one of the following signaling: RRC dedicated signaling, a system message, MAC layer signaling, or physical layer signaling.

In this embodiment, a resource that meets a limitation of the carrier switching time is excluded from the candidate resource set on the first carrier, and in this case, after the UE selects a resource on the first carrier, a case does not occur in which some data cannot be sent because the resource that meets the limitation of the carrier switching time is selected, thereby improving data transmission reliability and further improving safety of a vehicle.

Optionally, in still another embodiment, a method used by the UE to determine the first candidate resource subset includes: for each time domain resource in the candidate resource set, excluding, by the UE, all candidate resources on one time domain resource from the candidate resource set once there is an intersection between the one time domain resource and a time domain resource in the selected resources, to obtain the first candidate resource subset.

In this application, in a process of selecting a resource on the first carrier, a candidate resource that has an intersection with the selected resources in time domain is directly excluded, and then a resource on the first carrier is selected from a subset obtained after the exclusion, so that resource selection efficiency can be improved.

Optionally, the selecting, by the UE, a resource on the first carrier from the first candidate resource subset includes: randomly selecting, by the UE, a resource on the first carrier from the first candidate resource subset.

In this embodiment, a resource is excluded from the candidate resource set on the first carrier based on the first preset condition, and then a resource on the first carrier is randomly selected from resources obtained after the exclusion, so that on the selected resource, a case does not occur in which some data cannot be sent because of limitations of one or more of the following information: the quantity of transmit chains, the transmit power, the quantity of occupied resource blocks, an adjacent carrier, and the carrier switching time. Therefore, in this embodiment, data transmission reliability can be improved, and further, safety of a vehicle can be improved.

With reference to the first aspect, in a possible embodiment of the first aspect, the preset condition includes a second preset condition; and the selecting, by the UE, a resource on the first carrier from the first candidate resource subset includes: selecting, by the UE, the resource on the first carrier from the first candidate resource subset, where the resource meets the second preset condition, where the second preset condition is that there is an intersection between a time domain resource of the resource and a time domain resource of a third selected resource in the selected resources.

In this embodiment, a resource is excluded from the candidate resource set on the first carrier based on the first preset condition, and then a candidate resource that meets the second preset condition is selected, from resources obtained after the exclusion, as a resource selected on the first carrier. Therefore, on the selected resource, a case does not occur in which some data cannot be sent because of limitations of one or more of the following information: the quantity of transmit chains, the transmit power, the quantity of occupied resource blocks, an adjacent carrier, and the carrier switching time. In addition, resources used by the UE to send data can be reduced to some extent, and resources used to receive data are increased accordingly. In this way, the half-duplex limitation to the UE can be overcome, data transmission reliability can be improved, and further, safety of a vehicle can be improved.

With reference to the first aspect, in a possible embodiment of the first aspect, the selecting, by the UE, the resource on the first carrier from the first candidate resource subset, where the resource meets the second preset condition includes: determining, by the UE, a second candidate resource subset from the first candidate resource subset, where each candidate resource in the second candidate resource subset meets the second preset condition; and selecting, by the UE, a resource on the first carrier from the second candidate resource subset based on one or more of the following attributes of a resource in the selected resources that corresponds to each candidate resource in the second candidate resource subset: a quantity of occupied carriers or frequency bands, an amount of to-be-sent data, a quantity of occupied resource blocks, and a priority of the to-be-sent data, where the resource in the selected resources that corresponds to each candidate resource in the second candidate resource subset indicates a resource in the selected resources that has an intersection with the candidate resource in the second candidate resource subset in terms of time domain resources.

Optionally, in an embodiment, the first carrier is a carrier adjacent to one of the other carriers.

With reference to the first aspect, in a possible embodiment of the first aspect, there is no intersection between a candidate resource in the first candidate resource subset and the selected resources in terms of time domain resources, and a time domain resource of the resource selected on the first carrier is a first time domain resource; and after the UE selects the resource on the first carrier, before the UE sends the first data by using the resource selected on the first carrier, the communication method further includes: selecting, by the UE, a resource on a second carrier, where a time domain resource of the resource selected on the second carrier is a second time domain resource, and there is no intersection between the second time domain resource and the first time domain resource; and when determining that the first candidate resource subset includes a candidate resource that has an intersection with the second time domain resource in time domain, reselecting, by the UE, a resource on the first carrier, so that there is an intersection between the resource selected on the first carrier and the second time domain resource in time domain.

In this embodiment, a resource selected first may vary with a resource selected next, so that time domain resources used by the UE to send data can be further reduced, and time domain resources used to receive data are increased accordingly. In this way, receiving performance of the UE can be improved, data transmission reliability can also be improved, and further, safety of a vehicle can be improved.

With reference to the first aspect, in a possible embodiment of the first aspect, there is no intersection between a candidate resource in the first candidate resource subset and the selected resources in terms of time domain resources, and a time domain resource of the resource selected on the first carrier is a first time domain resource; and after the UE selects the resource on the first carrier, before the UE sends the first data by using the resource selected on the first carrier, the communication method further includes: in a process of selecting a resource on a third carrier, determining, by the UE, that there is an intersection between a third time domain resource in a candidate resource set on the third carrier and a fourth time domain resource in the first candidate resource subset, where there is no intersection between the fourth time domain resource and the first time domain resource; determining, by the UE, a candidate resource on the third time domain resource on the third carrier as a resource selected on the third carrier; and re-determining, by the UE, a candidate resource on the fourth time domain resource in the first candidate resource subset as a resource selected on the first carrier.

In this embodiment, a resource selected first may vary with a resource selected next, so that time domain resources used by the UE to send data can be further reduced, and time domain resources used to receive data are increased accordingly. In this way, receiving performance of the UE can be improved, data transmission reliability can also be improved, and further, safety of a vehicle can be improved.

With reference to the first aspect, in a possible embodiment of the first aspect, the selecting, by the UE, a resource on the first carrier from the candidate resource set based on a preset condition includes: selecting, by the UE, the resource on the first carrier from the candidate resource set, where the resource meets a second preset condition, where the second preset condition is that there is an intersection between a time domain resource of the resource and a time domain resource of a fourth selected resource in the selected resources.

In this embodiment, a resource on the first carrier is selected from the candidate resource set on the first carrier based on the second preset condition, and the second preset condition indicates that there is an intersection between the selected resource and the selected resources in time domain. Therefore, resources used by the UE to send data can be reduced to some extent, and resources used to receive data are increased accordingly. In this way, the half-duplex limitation to the UE can be overcome, data transmission reliability can be improved, and further, safety of a vehicle can be improved.

With reference to the first aspect, in a possible embodiment of the first aspect, the selecting the resource on the first carrier from the candidate resource set, where the resource meets the second preset condition includes: determining, by the UE, a third candidate resource subset from the candidate resource set, where each candidate resource in the third candidate resource subset meets the second preset condition; and selecting, by the UE, a resource on the first carrier from the third candidate resource subset based on one or more of the following attributes of a resource in the selected resources that corresponds to each candidate resource in the third candidate resource subset: a quantity of occupied carriers or frequency bands, an amount of to-be-sent data, a quantity of occupied resource blocks, and a priority of the to-be-sent data, where the resource in the selected resources that corresponds to each candidate resource in the third candidate resource subset indicates a resource in the selected resources that has an intersection with the candidate resource in the third candidate resource subset in terms of time domain resources.

In this embodiment, a resource on the first carrier is selected from the candidate resource set on the first carrier based on the second preset condition, and the second preset condition indicates that there is an intersection between the selected resource and the selected resources in time domain. Therefore, resources used by the UE to send data can be reduced to some extent, and resources used to receive data are increased accordingly. In this way, the half-duplex limitation to the UE can be overcome, data transmission reliability can be improved, and further, safety of a vehicle can be improved.

According to a second aspect, a terminal device is provided, and the terminal device is configured to perform the method in the first aspect or any possible embodiment of the first aspect. Specifically, the terminal device may include a module configured to perform the method in the first aspect or any possible embodiment of the first aspect.

According to a third aspect, a terminal device is provided, and the terminal device includes a memory and a processor. The memory is configured to store an instruction, the processor is configured to execute the instruction stored in the memory, and when executing the instruction stored in the memory, the processor performs the method in the first aspect or any possible embodiment of the first aspect.

According to a fourth aspect, a chip is provided, and the chip includes a processing module and a communications interface. The processing module is configured to control the communications interface to communicate with the outside, and the processing module is further configured to implement the method in the first aspect or any possible embodiment of the first aspect.

According to a fifth aspect, a computer-readable storage medium is provided, and a computer program is stored in the computer-readable storage medium. When the computer program is executed by a computer, the computer implements the method in the first aspect or any possible embodiment of the first aspect. Specifically, the computer may be the foregoing terminal device.

According to a sixth aspect, a computer program product including an instruction is provided. When the instruction is executed by a computer, the computer implements the method in the first aspect or any possible embodiment of the first aspect. Specifically, the computer may be the foregoing terminal device.

DESCRIPTION OF EMBODIMENTS

The following describes technical solutions of this application with reference to accompanying drawings.

Figure 1:
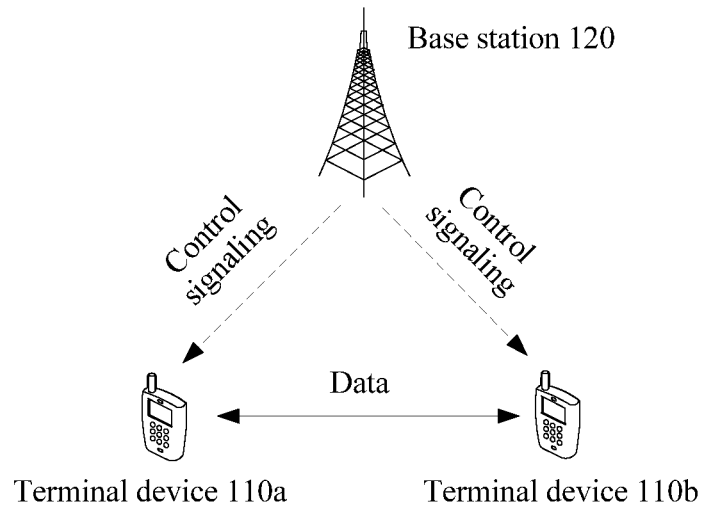
FIG. 1 is a schematic diagram of a communications system according to an embodiment of this application.

FIG. 1 is a schematic diagram of a communications system according to an embodiment of this application. The communications system includes a plurality of terminal devices 110 (FIG. 1 shows only two terminal devices 110a and 110b, but the embodiments herein are not limited thereto). The plurality of terminal devices 110 directly communicate with each other. In other words, the terminal devices 110 may directly communicate with each other without forwarding by a base station.

The terminal device in this embodiment of this application is a device that has a function of direct communication between terminal devices. In other words, the terminal device in this embodiment of this application is a terminal device in a terminal device-to-terminal device technology.

It should be understood that the terminal device-to-terminal device technology is an end-to-end technology of direct communication, and a biggest difference from a conventional cellular communications technology is that terminal devices can directly communicate with each other without forwarding by a base station, and the base station may perform resource configuration, scheduling, coordination, and the like, to assist in direct communication between the terminals.

Optionally, the communications system further includes a base station 120, and the base station 120 is configured to assist in communication between the plurality of terminal devices 110.

Specifically, the base station 120 may perform resource configuration, scheduling, coordination, or the like, to assist in direct communication between the terminal devices 110.

For example, the base station 120 sends control signaling to the terminal device 110. The control signaling is used to indicate a transmission resource allocated by the base station 120 to the terminal device 110.

FIG. 1 shows only two terminal devices. It should be understood that FIG. 1 is merely an example but not a limitation. In actual application, a quantity of terminal devices in the communications system may be determined based on an actual requirement, and is not limited in this embodiment of this application.

Optionally, the communications system is an Internet of Vehicles system.

Specifically, the communications system is an Internet of Vehicles system without assistance of a base station, or the communications system is an Internet of Vehicles system with assistance of a base station.

Specifically, the communications system is a V2X (Vehicle to X) system.

It should be noted that the terminal device in this embodiment of this application has a multi-carrier sending and receiving function, or has a carrier aggregation (CA) function.

For example, in the scenario shown in FIG. 1, the terminal device 110a may communicate with the terminal device 110b by using a plurality of carriers.

It should be further noted that the technical solution in this embodiment of this application may be applied to a fifth generation (5G) communications system or a communications system after 5G and this is not limited in this embodiment of this application.

Optionally, the terminal device in this embodiment of this application may be a handheld device, such as a mobile phone, that has a wireless communication function, or may be a computing device, a wearable device, an in-vehicle device, a vehicle, or the like. In addition, the terminal device in this embodiment of this application may also refer to user equipment (UE), a user terminal, a mobile device, a wireless communications device, or a user apparatus, and this is not limited in this embodiment of this application. For ease of understanding and description, the following uses the UE as an example to describe each method embodiment.

Optionally, a network device in some embodiments of this application may be a network side device that has a radio resource management function and that can communicate with the terminal device. The network device may be an evolved NodeB (Evolutional Node B, eNB or eNodeB) in a Long Term Evolution (LTE) system, or a network side device in a 5G network or a network after 5G Alternatively, the network device may serve as a central controller to assist in direct communication between terminal devices. For example, the network device is the base station shown in FIG. 1.

As described above, prior solutions of selecting a resource by a terminal device has some problems when being applied to a multi-carrier scenario, and therefore a resource selection solution applicable to the multi-carrier scenario needs to be urgently proposed.

For the foregoing problem, this application provides a solution, applicable to a multi-carrier scenario, of selecting a resource by a terminal device.

It should be understood that when sending data by using a plurality of carriers, UE needs to select a resource on each carrier. For ease of understanding and description, an example in which the UE selects a resource on a current carrier is used for description in this specification. It should be noted that the solution provided in this application is applicable to selecting a resource by the UE on each of the plurality of carriers.

Figure 2:
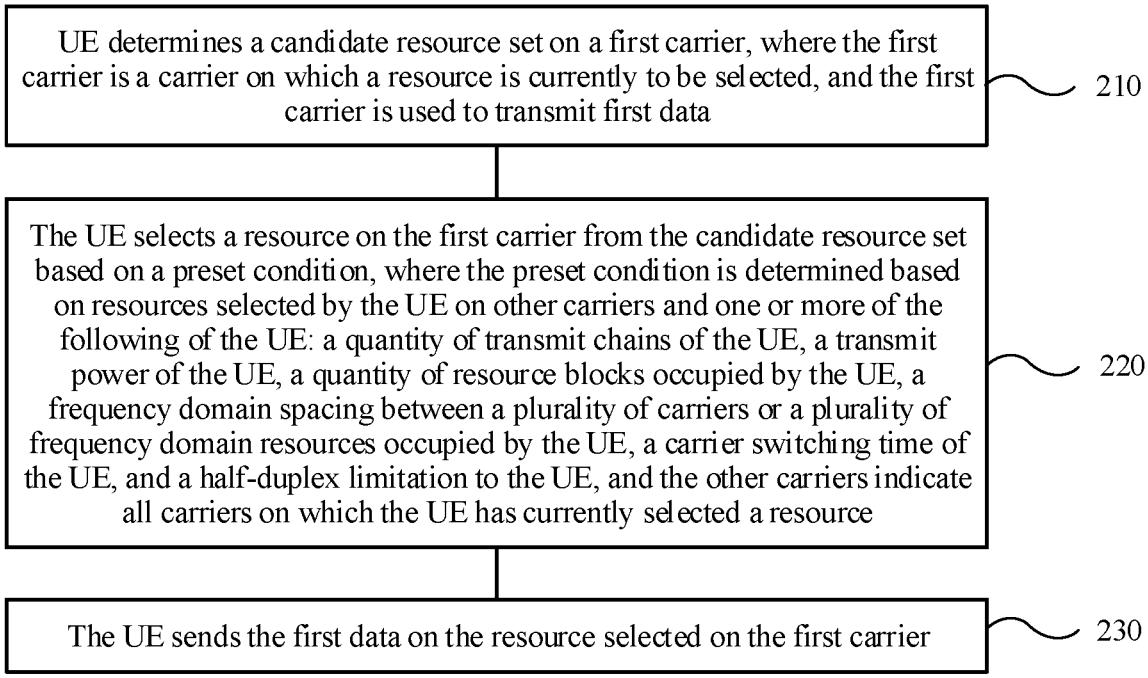
FIG. 2 is a schematic flowchart of a communication method according to an embodiment of this application.

FIG. 2 is a schematic flowchart of a communication method according to an embodiment of this application. The communication method may be performed by UE, and the UE corresponds to the terminal device 110 shown in FIG. 1. As shown in FIG. 2, the communication method includes the following steps.

210. The UE determines a candidate resource set on a first carrier, where the first carrier is a carrier on which a resource is currently to be selected, and the first carrier is used to transmit first data.

Specifically, the UE determines the candidate resource set on the first carrier based on resource information sensed by the UE.

220. The UE selects a resource on the first carrier from the candidate resource set based on a preset condition, where the preset condition is determined based on resources selected by the UE on other carriers and one or more of the following information of the UE: a quantity of transmit chains of the UE, a transmit power of the UE, a quantity of resource blocks occupied by the UE, a frequency domain spacing between a plurality of carriers or a plurality of frequency domain resources occupied by the UE, a carrier switching time of the UE, and a half-duplex limitation to the UE, the other carriers indicate all carriers on which the UE has currently selected a resource, and the other carriers are used to transmit second data.

Specifically, when the UE has newly arrived data, the UE is triggered to select a resource on the first carrier for sending. Alternatively, because of triggering by some conditions, the UE needs to perform resource reselection for a resource selected on the first carrier.

Specifically, step 210 may be performed by a physical layer of the UE, and step 220 may be performed by a higher layer or the physical layer of the UE. For example, the physical layer performs sensing, and constructs the candidate resource set. The physical layer reports the candidate resource set to the higher layer, and the higher layer selects a resource from the candidate resource set, or the physical layer further directly selects a resource.

230. The UE sends the first data on the resource selected on the first carrier.

Optionally, the resource selected by the UE on the first carrier may be used to dynamically send data. For example, the resource selected by the UE on the first carrier is used to send only one piece of data.

Optionally, the resource selected by the UE on the first carrier may be used to send data through reservation. For example, the resource selected by the UE on the first carrier is a periodic resource in terms of time, and may be used to send periodic data.

Optionally, the first data to be sent on the first carrier may be the same as or different from the second data to be sent on the other carriers.

Specifically, when the first data is the same as the second data, step 230 further includes: sending, by the UE, the second data on resources selected on the other carriers.

It should be understood that in a multi-carrier sending scenario, the UE may select a same time domain resource to send data on different carriers, but the data to be sent at the same time may fall beyond a sending capability of the UE. For example, an amount of data to be sent at the same time exceeds the quantity of transmit chains of the UE, or a transmit power of the data to be sent at the same time exceeds a maximum transmit power of the UE. In this case, some data cannot be sent. Consequently, data transmission reliability is reduced, and further, safety of a vehicle is compromised. For another example, when the UE sends a plurality of pieces of data on a same time domain resource on non-consecutive or non-adjacent carriers, third-order intermodulation may occur, causing serious interference to another UE that sends data on the same time domain resource but on a different frequency domain resource. Consequently, system performance is adversely affected, and safety of a vehicle is compromised. For another example, when resources selected by the UE on different carries are relatively close in time domain, after the UE is switched from one carrier to another carrier, the UE may miss a selected time domain resource on the another carrier because of a limitation of a switching time, and in this case, data cannot be sent. Consequently, system performance is adversely affected, and safety of a vehicle is compromised. In addition, in the multi-carrier sending scenario, the UE may select different time domain resources to send data on different carriers, and more time domain resources are used to send data on the whole. However, because of the half-duplex limitation, the UE cannot receive data while sending data. Therefore, when the UE selects different time domain resources to send data on different carriers, the UE cannot receive a relatively large amount of data. Consequently, data transmission reliability is also reduced, and further, safety of a vehicle is compromised.

However, in this application, the resource is selected on the first carrier based on the selected resources on the other carriers and one or more of the following information of the UE: the quantity of transmit chains, the transmit power, the quantity of occupied resource blocks, the frequency domain spacing between the occupied plurality of carriers or the occupied plurality of frequency domain resources, the carrier switching time, or the half-duplex limitation, so that the following can be achieved to some extent: on the resource selected on the first carrier, sending data by the UE on a same time domain resource falls within the sending capability of the UE, and/or the UE can keep as many time domain resources as possible to receive data, to overcome the half-duplex limitation to the UE. Therefore, in this embodiment of this application, in the multi-carrier scenario, a resource on a current carrier is selected based on selected resources and another constraint condition, so that a large amount of data can be prevented from being discarded because a limited resource is selected, thereby improving data transmission reliability to some extent and further improving safety of a vehicle.

Figure 3:
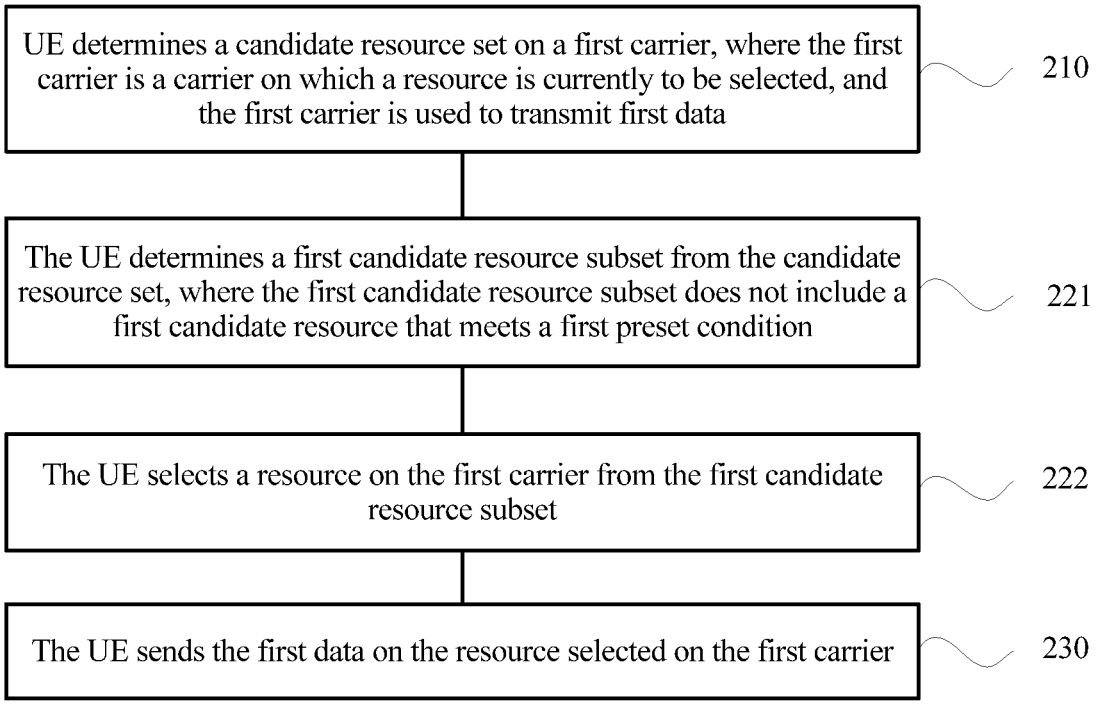
FIG. 3 is a schematic flowchart of a communication method according to another embodiment of this application.

Optionally, the preset condition includes a first preset condition. As shown in FIG. 3, step 220 further includes step 221 and step 222.

Step 221: The UE determines a first candidate resource subset from the candidate resource set, where the first candidate resource subset does not include a first candidate resource that meets the first preset condition.

In other words, the first candidate resource meets the first preset condition.

That the first candidate resource meets the first preset condition indicates that there is an intersection between a time domain resource of the first candidate resource and a time domain resource of a first selected resource in the selected resources, and the first selected resource meets a condition determined based on one or more of the following information of the UE: the quantity of transmit chains of the UE, the transmit power of the UE, the quantity of resource blocks occupied by the UE, and the frequency domain spacing between the plurality of carriers or the plurality of frequency domain resources occupied by the UE; and/or that the first candidate resource meets the first preset condition indicates that there is no intersection between the time domain resource of the first candidate resource and a time domain resource of a second selected resource in the selected resources, and a time domain spacing between the first candidate resource and the second selected resource meets a condition determined based on the carrier switching time of the UE.

Optionally, the time domain resource in this embodiment of this application may be one or more symbols, slots, subframes, or frames.

Optionally, the first candidate resource may indicate one candidate resource, or may indicate a plurality of candidate resources.

It should be noted that the first candidate resource subset, a second candidate resource subset, and a third candidate resource subset described in this specification are for ease of description, in actual application, a subset does not necessarily need to be set, and this is not limited in this embodiment of this application.

A candidate resource that meets the first preset condition in the candidate resource set on the first carrier may be understood as a candidate resource, on the first carrier, that falls beyond the sending capability of the UE. The first preset condition is described in detail below.

Step 222: The UE selects a resource on the first carrier from the first candidate resource subset.

Therefore, in this embodiment of this application, in the multi-carrier sending scenario, the UE selects a resource on a carrier based on selected resources on other carriers and the sending capability of the UE, so that the selected resource can meet a constraint condition related to the sending capability of the UE, thereby improving data transmission reliability to some extent and further improving safety of a vehicle.

Specifically, step 221 means excluding a candidate resource that meets the first preset condition from the candidate resource set on the first carrier.

Optionally, step 221 specifically includes: for each time domain resource in the candidate resource set, excluding, by the UE, all candidate resources on one time domain resource from the candidate resource set once the one time domain resource meets the first preset condition, to determine the first candidate resource subset. Optionally, the determining the first candidate resource subset mentioned herein may be determining all resources obtained after the exclusion as the first candidate resource subset, or may be determining some resources obtained after the exclusion as the first candidate resource subset.

That the one time domain resource meets the first preset condition indicates that there is an intersection between the one time domain resource and the time domain resource of the first selected resource in the selected resources, and the first selected resource meets the condition determined based on one or more of the following information of the UE: the quantity of transmit chains of the UE, the transmit power of the UE, the quantity of resource blocks occupied by the UE, and the frequency domain spacing between the plurality of carriers or the plurality of frequency domain resources occupied by the UE; and/or that the one time domain resource meets the first preset condition indicates that there is no intersection between the one time domain resource and the time domain resource of the second selected resource in the selected resources, and the time domain spacing between the first candidate resource and the second selected resource meets the condition determined based on the carrier switching time of the UE.

Specifically, the UE checks all time domain resources included in the candidate resource set one by one, and excludes a candidate resource on one time domain resource once the one time domain resource meets the first preset condition. A time domain resource n in the candidate resource set is used as an example. If the UE has selected a resource on at least K carriers on the time domain resource n, assuming that K is a maximum quantity of transmit chains of the UE, all candidate resources on the time domain resource n need to be excluded from the candidate resource set.

Optionally, step 221 specifically includes: for each candidate resource in the candidate resource set, excluding, by the UE, one candidate resource from the candidate resource set once the one candidate resource meets the first preset condition, to determine the first candidate resource subset.

That the one candidate resource meets the first preset condition indicates that there is an intersection between a time domain resource of the one candidate resource and the time domain resource of the first selected resource in the selected resources, and the first selected resource meets the condition determined based on one or more of the following information of the UE: the quantity of transmit chains of the UE, the transmit power of the UE, the quantity of resource blocks occupied by the UE, and the frequency domain spacing between the plurality of carriers or the plurality of frequency domain resources occupied by the UE; and/or that the one candidate resource meets the first preset condition indicates that there is no intersection between a time domain resource of the one candidate resource and the time domain resource of the second selected resource in the selected resources, and the time domain spacing between the first candidate resource and the second selected resource meets the condition determined based on the carrier switching time of the UE.

Specifically, the UE checks all candidate resources included in the candidate resource set one by one, and excludes one candidate resource once the one time domain resource meets the first preset condition. A candidate resource x in the candidate resource set is used as an example. If the UE has selected a resource on at least K carriers on a time domain resource n1 of the candidate resource x, assuming that K is a maximum quantity of transmit chains of the UE, the candidate resource x needs to be excluded from the candidate resource set.

Figure 4:
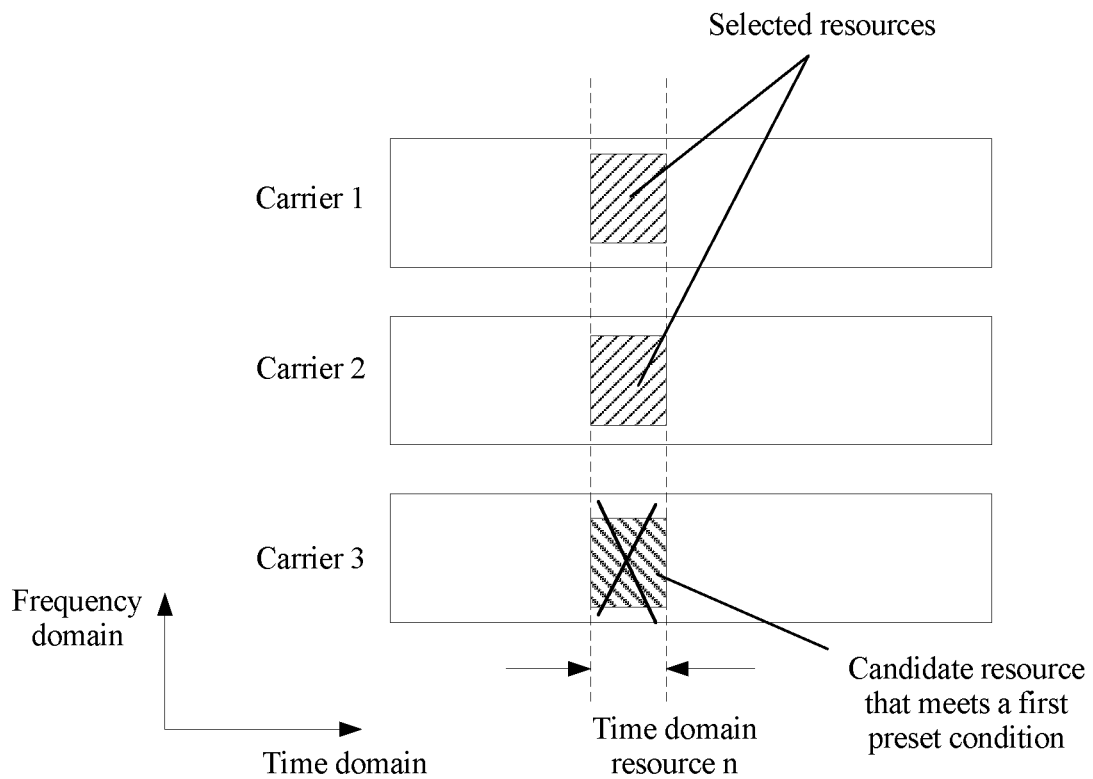
FIG. 4 is a schematic diagram of selecting a resource according to an embodiment of this application.
Figure 5:
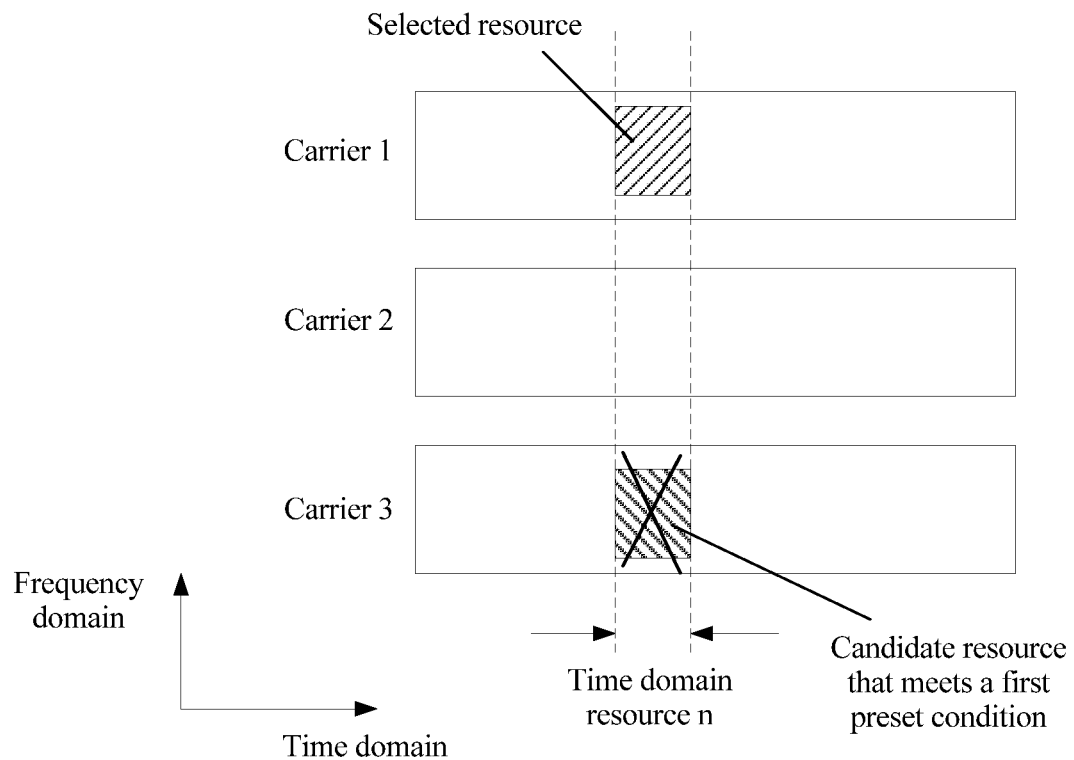
FIG. 5 is another schematic diagram of selecting a resource according to an embodiment of this application.
Figure 6:
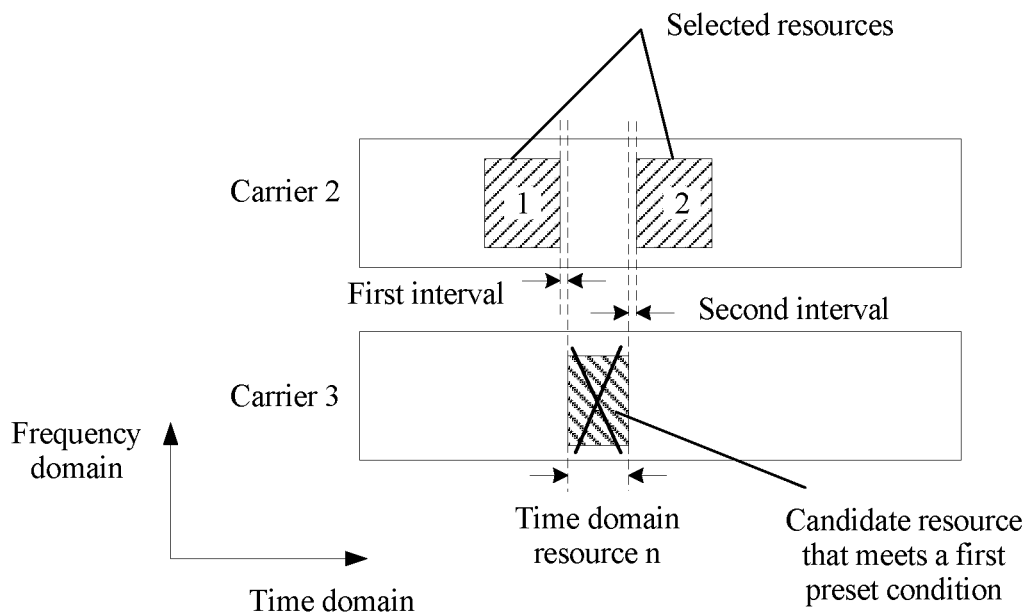
FIG. 6 is still another schematic diagram of selecting a resource according to an embodiment of this application.

The following describes in detail the first preset condition with reference to FIG. 4 to FIG. 6.

Optionally, in some embodiments, the first candidate resource meets the first preset condition, the first preset condition includes a constraint condition determined based on the quantity of transmit chains of the UE, and the first preset condition specifically includes: there is an intersection between the time domain resource of the first candidate resource and the time domain resource of the first selected resource in the selected resources; and a quantity of carriers corresponding to the first selected resource is greater than or equal to a first threshold; or a sum of a quantity of carriers corresponding to the first selected resource and a quantity of carriers corresponding to a currently selected resource is greater than or equal to a second threshold; or a quantity of frequency bands corresponding to the first selected resource is greater than or equal to a third threshold; or a sum of a quantity of frequency bands corresponding to the first selected resource and a quantity of frequency bands corresponding to a currently selected resource is greater than or equal to a fourth threshold; or an amount of to-be-sent data on the first selected resource is greater than or equal to a fifth threshold; or a sum of an amount of to-be-sent data on the first selected resource and an amount of to-be-sent data on a currently selected resource is greater than or equal to a sixth threshold.

Specifically, the amount of to-be-sent data mentioned above may be a quantity of transport blocks.

Specifically, the first threshold, the second threshold, the second threshold, the fourth threshold, the fifth threshold, or the sixth threshold may be determined based on a maximum value of the quantity of transmit chains of the UE, or may be a preset threshold.

For example, the first threshold, the third threshold, or the fifth threshold is the maximum value of the quantity of transmit chains of the UE. For another example, the second threshold, the fourth threshold, or the sixth threshold is a preset threshold, and the preset threshold is greater than the maximum value of the quantity of transmit chains of the UE.

Optionally, the first threshold, the second threshold, the third threshold, the fourth threshold, the fifth threshold, or the sixth threshold in this embodiment is preconfigured on the UE, or is obtained by the UE from a network device (for example, a base station) by using any one of the following signaling: radio resource control (RRC) dedicated signaling, a system message, medium access control (MAC) layer signaling, or physical layer signaling.

For example, as shown in FIG. 4, the UE has three carriers (a carrier 1, a carrier 2, and a carrier 3). Resources have been selected on the carrier 1 and the carrier 2, and the carrier 3 is a carrier on which a resource is currently to be selected. The UE selects a resource from a candidate resource set on the carrier 3, and the UE determines all time domain resources included in the candidate resource set one by one. The UE excludes a candidate resource on one time domain resource once the UE finds that the one time domain resource meets a constraint condition related to the quantity of transmit chains of the UE. A time domain resource n in the candidate resource set is used as an example. As shown in FIG. 4, the UE determines that two resources (selected resources shown in FIG. 4) have been selected on the carrier 1 and the carrier 2 on the time domain resource n. When the UE determines that a quantity of frequency bands of the selected resources is greater than or equal to K, or a sum of a quantity of frequency bands of the selected resources and a quantity of frequency bands on which the current carrier is located is greater than or equal to K, or an amount of to-be-sent data on the selected resources is greater than or equal to K, or a sum of an amount of to-be-sent data on the selected resources and an amount of to-be-sent data on a currently selected resource is greater than or equal to K, or a quantity of carriers of the selected resources is greater than or equal to K, or a sum of a quantity of carriers of the selected resources and a quantity of carriers of a currently selected resource is greater than or equal to K, a candidate resource on the time domain resource n is a candidate resource that meets the first preset condition, and the candidate resource on the time domain resource n needs to be excluded from the candidate resource set (as shown in FIG. 4). K may be an actual quantity of transmit chains of the UE, or may be a threshold. For example, K may be less than the quantity of transmit chains of the UE, may be preconfigured on the UE, or may be sent by an eNB to the UE by using RRC signaling, MAC layer signaling, or physical layer signaling.

For ease of understanding and description, the constraint condition determined based on the quantity of transmit chains of the UE is denoted as a condition (a) below.

Therefore, in this embodiment, a resource that meets a limitation of the quantity of transmit chains is excluded from the candidate resource set on the first carrier, and in this case, after the UE selects a resource, a case does not occur in which some data cannot be sent because of the limitation of the quantity of transmit chains, thereby improving data transmission reliability and further improving safety of a vehicle.

Optionally, in this embodiment, the communication method further includes: sending, by the UE, the quantity of transmit chains of the UE to a network device; receiving, by the UE from the network device, a threshold configured based on the quantity of transmit chains of the UE; and determining, by the UE, each threshold (the first threshold, the second threshold, the third threshold, the fourth threshold, the fifth threshold, or the sixth threshold) in the condition (a) based on the threshold configured by the network device.

Optionally, the UE may directly determine each threshold in the condition (a) based on the quantity of transmit chains of the UE.

Optionally, the UE may directly determine each threshold in the condition (a) by using a threshold commonly configured by the network device (for example, an eNB).

It should be further understood that because different UEs may have different quantities of transmit chains, in a mode 3, the UE may report a quantity of transmit chains of the UE to the eNB, and the eNB schedules, based on the quantity of transmit chains, the UE to send data. For example, if the UE has two transmit chains, the eNB schedules the UE to send data on a maximum of two frequency bands or carriers on a same time domain resource, or schedules the UE to send a maximum of two pieces of data on a same time domain resource.

Optionally, in some embodiments, the first candidate resource meets the first preset condition, the first preset condition includes a constraint condition determined based on the transmit power of the UE, and the first preset condition specifically includes: there is an intersection between the time domain resource of the first candidate resource and the time domain resource of the first selected resource in the selected resources; and a sum of a power of to-be-sent data on the first selected resource and a power of to-be-sent data on the first carrier is greater than or equal to a seventh threshold; or an absolute value of a difference between a power of to-be-sent data on at least one carrier corresponding to the first selected resource and a power of to-be-sent data on the first carrier is greater than or equal to an eighth threshold.

Specifically, the seventh threshold may be determined based on a maximum value of the transmit power of the UE, or may be a preset threshold.

For example, the seventh threshold is the maximum value of the transmit power of the UE.

Specifically, the eighth threshold may be determined based on a maximum difference between transmit powers at which the UE sends different data, or may be a preset threshold.

For example, the eighth threshold is the maximum difference between transmit powers at which the UE sends different data.

Optionally, the seventh threshold or the eighth threshold in this embodiment is preconfigured on the UE, or is obtained by the UE from a network device (for example, a base station) by using any one of the following signaling: RRC dedicated signaling, a system message, MAC layer signaling, or physical layer signaling.

For example, as shown in FIG. 4, the UE has three carriers (a carrier 1, a carrier 2, and a carrier 3). Resources have been selected on the carrier 1 and the carrier 2, and the carrier 3 is a carrier on which a resource is currently to be selected. The UE selects a resource from a candidate resource set on the carrier 3, and the UE determines all time domain resources included in the candidate resource set one by one. The UE excludes a candidate resource on one time domain resource once the UE finds that the one time domain resource meets a constraint condition related to the transmit power of the UE. A time domain resource n in the candidate resource set is used as an example. If a sum of powers of data to be transmitted by the UE on the carrier 3, the carrier 1, and the carrier 2 on the time domain resource n is greater than or equal to P, all candidate resources on the time domain resource n need to be excluded from the candidate resource set. P may be the maximum transmit power of the UE, may be a fixed threshold, may be preconfigured on the UE, or may be sent by an eNB to the UE by using RRC signaling, MAC layer signaling, or physical layer signaling, or the like.

FIG. 4 is still used as an example. For another example, if the UE determines that on a time domain resource n, two resources have been selected on a carrier 1 and a carrier 2, and a difference (or an absolute value of a difference) between either of powers (for example, P1 and P2 respectively) of data to be sent on the two resources and a power (for example, P3) of data to be sent on a carrier 3 is greater than or equal to Q (for example, |P1−P3|>Q and |P2−P3|>Q), the UE excludes all candidate resources on the time domain resource n from the candidate resource set. Q may be a maximum difference between different data powers, may be a fixed threshold, may be preconfigured on the UE, or may be sent by an eNB to the UE by using RRC signaling, MAC layer signaling, or physical layer signaling, or the like.

In the prior approaches, when UE prepares to send data on a time domain resource n, a resource pool congestion degree of a time domain resource n-4 needs to be considered to determine a data power. When the UE can accurately determine a transmit power of a piece of to-be-sent data at a time point of selecting a resource, the UE excludes a resource based on the foregoing condition and the power. When a time point of selecting a resource is earlier, the UE cannot accurately pre-determine a power at which the UE sends data on the time domain resource n, and the UE may determine the power based on a resource pool congestion degree obtained through measurement at the time point of selecting a resource, or determine the power based on a resource pool congestion degree previously obtained through measurement, or use a power at which data is previously sent as an estimation of an actual power, and exclude a resource based on the foregoing condition and the estimated power.

In this application, the UE may determine a data transmit power based on a resource pool congestion degree obtained through measurement at a time point of selecting a resource. For example, in FIG. 4, if the UE selects a resource on the carrier 3 at a time point k, the UE determines a power of to-be-sent data on the carrier 1 based on a resource pool congestion degree of the carrier 1 that is obtained through measurement at the time point, or the UE may determine a data transmit power based on only a factor other than a resource pool congestion degree, and use the power as an estimation of a power at which data is to be sent on the time domain resource n. It should be understood that when power backoff needs to be considered, assuming that a power back-off value is P', P in the foregoing expression is replaced with P−P'.

For ease of understanding and description, the constraint condition determined based on the transmit power of the UE is denoted as a condition (b) below.

Therefore, in this embodiment, a resource with a power limitation is excluded from the candidate resource set on the first carrier, and in this case, after the UE selects a resource, a case does not occur in which a large amount of data is discarded or a power is significantly reduced because the resource with the power limitation is selected, thereby improving data transmission reliability and further improving safety of a vehicle.

Optionally, in some embodiments, the first candidate resource meets the first preset condition, the first preset condition includes a constraint condition determined based on the quantity of resource blocks occupied by the UE, and the first preset condition specifically includes: there is an intersection between the time domain resource of the first candidate resource and the time domain resource of the first selected resource in the selected resources; and a sum of a quantity of resource blocks occupied by to-be-sent data on the first selected resource and a quantity of resource blocks occupied by to-be-sent data on the first carrier is greater than or equal to a ninth threshold.

Specifically, the ninth threshold may be determined based on a maximum value of the quantity of resource blocks occupied by the UE, or may be a preset threshold.

For example, the ninth threshold is the maximum value of the quantity of resource blocks occupied by the UE.

Optionally, the ninth threshold in this embodiment is preconfigured on the UE, or is obtained by the UE from a network device (for example, a base station) by using any one of the following signaling: RRC dedicated signaling, a system message, MAC layer signaling, or physical layer signaling.

For example, as shown in FIG. 4, the UE has three carriers (a carrier 1, a carrier 2, and a carrier 3). Resources have been selected on the carrier 1 and the carrier 2, and the carrier 3 is a carrier on which a resource is currently to be selected. The UE selects a resource from a candidate resource set on the carrier 3, and the UE determines all time domain resources included in the candidate resource set one by one. The UE excludes a candidate resource on one time domain resource once the UE finds that the one time domain resource meets a constraint condition related to the quantity of resource blocks occupied by the UE. A time domain resource n in the candidate resource set is used as an example. If a quantity of resource blocks occupied by data to be sent by the UE on the carrier 3, the carrier 1, and the carrier 2 on the time domain resource n is greater than or equal to R, all candidate resources on the time domain resource n need to be excluded from the candidate resource set. R may be a maximum quantity of resource blocks that can be occupied by the UE on one time domain resource, may be a fixed threshold, may be preconfigured on the UE, or may be sent by an eNB to the UE by using RRC signaling, MAC layer signaling, or physical layer signaling, or the like.

For ease of understanding and description, the constraint condition determined based on the quantity of resource blocks occupied by the UE is denoted as a condition (c) below.

Therefore, in this embodiment, a resource with a resource block quantity limitation is excluded from the candidate resource set on the first carrier, and in this case, after the UE selects a resource on the first carrier, a case does not occur in which a large amount of data is discarded or a power is significantly reduced because the resource with the resource block quantity limitation is selected, thereby improving data transmission reliability and further improving safety of a vehicle.

Optionally, in some embodiments, the first candidate resource meets the first preset condition, the first preset condition includes a constraint condition determined based on a limitation of the frequency domain spacing between the plurality of carriers or the plurality of frequency domain resources occupied by the UE, and the first preset condition specifically includes: there is an intersection between the time domain resource of the first candidate resource and the time domain resource of the first selected resource in the selected resources; and the first carrier and at least one carrier that corresponds to the first selected resource are non-adjacent carriers; or a frequency domain spacing between the first carrier and at least one carrier that corresponds to the first selected resource is greater than or equal to a tenth threshold; or the first carrier and at least one carrier that corresponds to the first selected resource are adjacent carriers, and a frequency domain spacing between the first candidate resource and a selected resource, on the at least one carrier, on the time domain resource of the first candidate resource is greater than or equal to an eleventh threshold, and/or the frequency domain spacing between the first candidate resource and the selected resource, on the at least one carrier, on the time domain resource of the first candidate resource is less than or equal to a twelfth threshold, where the eleventh threshold is less than the twelfth threshold.

Specifically, the tenth threshold, the eleventh threshold, or the twelfth threshold may be determined based on the limitation of the frequency domain spacing between the plurality of carriers or the plurality of frequency domain resources occupied by the UE, or may be a preset threshold.

Optionally, the tenth threshold, the eleventh threshold, or the twelfth threshold in this embodiment is preconfigured on the UE, or is obtained by the UE from a network device (for example, a base station) by using any one of the following signaling: RRC dedicated signaling, a system message, MAC layer signaling, or physical layer signaling.

Optionally, in this embodiment, the first carrier and the at least one carrier that corresponds to the first selected resource are non-adjacent carriers, specifically indicating that the first carrier and each carrier that corresponds to the first selected resource are non-adjacent carriers. Alternatively, the frequency domain spacing between the first carrier and the at least one carrier that corresponds to the first selected resource is greater than or equal to the tenth threshold, specifically indicating that a frequency domain spacing between the first carrier and each carrier that corresponds to the first selected resource is greater than or equal to the tenth threshold.

For example, as shown in FIG. 5, the UE has three carriers (a carrier 1, a carrier 2, and a carrier 3). Resources have been selected on the carrier 1 and the carrier 2, and the carrier 3 is a carrier on which a resource is currently to be selected. The UE selects a resource from a candidate resource set on the carrier 3, and the UE determines all time domain resources included in the candidate resource set one by one. The UE excludes a candidate resource on one time domain resource once the UE finds that the one time domain resource meets a constraint condition related to the frequency domain spacing between the plurality of carriers or the plurality of frequency domain resources occupied by the UE.

A time domain resource n in the candidate resource set is used as an example. The UE determines that a resource on the time domain resource n has been selected on the carrier 1, and the carrier 1 and the carrier 3 are non-adjacent carriers, or a frequency domain spacing between the carrier 1 and the carrier 3 is greater than F. In this case, the UE excludes all candidate resources on the time domain resource n from the candidate resource set. F may be a fixed threshold, may be preconfigured on the UE, or may be sent by an eNB to the UE by using RRC signaling, MAC layer signaling, or physical layer signaling, or the like.

For another example, a time domain resource n in the candidate resource set is used as an example. The UE determines that a resource on the time domain resource n has been selected on the carrier 1, and the carrier 1 is adjacent to the carrier 3. When the UE determines that a frequency domain spacing between each candidate resource on the time domain resource n on the carrier 3 and the selected resource on the time domain resource n on the carrier 1 is less than or equal to F1, and/or the spacing is greater than or equal to F2 (when the frequency domain spacing is less than or equal to F1, and greater than or equal to F2, the spacing falls between the two thresholds F1 and F2 (for example, [F2, F1], (F2, F1), [F2, F1), or (F2, F1])), the UE excludes all candidate resources on the time domain resource n from the candidate resource set. F1 and F2 may be two fixed thresholds, may be preconfigured on the UE, or may be sent by an eNB to the UE by using RRC signaling, MAC layer signaling, or physical layer signaling, or the like.

For ease of understanding and description, the constraint condition determined based on the limitation of the frequency domain spacing between the plurality of carriers or the plurality of frequency domain resources occupied by the UE is denoted as a condition (d) below.

Therefore, in this embodiment, a resource on a non-adjacent carrier is excluded from the candidate resource set on the first carrier, and in this case, after the UE selects a resource on the first carrier, a case does not occur in which some data cannot be sent or performance is adversely affected, for example, interference is caused to another carrier, after some data is sent because the resource on the non-adjacent carrier is selected, thereby improving data transmission reliability and further improving safety of a vehicle.

Optionally, in some embodiments, the first candidate resource meets the first preset condition, the first preset condition includes a constraint condition determined based on the carrier switching time of the UE, and the first preset condition specifically includes: there is no intersection between the time domain resource of the first candidate resource and the time domain resource of the second selected resource in the selected resources; and when the time domain resource of the first candidate resource follows the time domain resource of the second selected resource, an interval between an end moment of the time domain resource of the second selected resource and a start moment of the time domain resource of the first candidate resource is less than or equal to a thirteenth threshold; or when the time domain resource of the first candidate resource precedes the time domain resource of the second selected resource, an interval between a start moment of the time domain resource of the second selected resource and an end moment of the time domain resource of the first candidate resource is less than or equal to a fourteenth threshold.

Specifically, the thirteenth threshold or the fourteenth threshold may be determined based on the carrier switching time of the UE, or may be a preset threshold.

For example, the thirteenth threshold or the fourteenth threshold is equal to the carrier switching time of the UE.

Optionally, the thirteenth threshold or the fourteenth threshold in this embodiment is preconfigured on the UE, or is obtained by the UE from a network device (for example, a base station) by using any one of the following signaling: RRC dedicated signaling, a system message, MAC layer signaling, or physical layer signaling.

For example, as shown in FIG. 6, the UE has two carriers (a carrier 2 and a carrier 3). A resource has been selected on the carrier 2, and the carrier 3 is a carrier on which a resource is currently to be selected. The UE selects a resource from a candidate resource set on the carrier 3, and the UE determines all time domain resources included in the candidate resource set one by one. The UE excludes a candidate resource on one time domain resource once the UE finds that the one time domain resource meets a constraint condition related to the carrier switching time of the UE.

A time domain resource n in the candidate resource set is used as an example. When the UE determines that a resource (for example, a selected resource 1 shown in FIG. 5, where the resource is denoted as the selected resource 1 below) preceding the time domain resource n has been selected on the carrier 2, and an interval (for example, a first interval shown in FIG. 5) between a time domain resource end moment of the selected resource 1 and a start moment of the time domain resource n is less than T; and/or the UE determines that a resource (for example, a selected resource 2 shown in FIG. 5, where the resource is denoted as the selected resource 2 below) following the time domain resource n has been selected on the carrier 2, and an interval (for example, a second interval shown in FIG. 5) between a time domain resource start moment of the selected resource 2 and an end moment of the time domain resource n is less than T, the UE excludes all candidate resources on the time domain resource n from the candidate resource set.

For another example, a time domain resource n in the candidate resource set is used as an example. When the UE determines that a resource preceding the time domain resource n has been selected on another frequency band (different from a frequency band on which a carrier 1 is located), and an interval between a time domain resource end moment of the resource and a start moment of the time domain resource n is less than T; and/or the UE determines that a resource following the time domain resource n has been selected on another frequency band (different from the frequency band on which the carrier 1 is located), and an interval between a time domain resource start moment of the resource and an end moment of the time domain resource n is less than T, the UE excludes all candidate resources on the time domain resource n from the candidate resource set. T may be the carrier switching time of the UE, may be a threshold, may be preconfigured on the UE, or may be sent by an eNB to the UE by using RRC signaling, MAC layer signaling, or physical layer signaling, or the like.

For ease of understanding and description, the constraint condition determined based on the carrier switching time of the UE is denoted as a condition (e) below.

Therefore, in this embodiment, a resource that meets a limitation of the carrier switching time is excluded from the candidate resource set on the first carrier, and in this case, after the UE selects a resource on the first carrier, a case does not occur in which some data cannot be sent because the resource that meets the limitation of the carrier switching time is selected, thereby improving data transmission reliability and further improving safety of a vehicle.

It should be understood that the solutions described above with reference to FIG. 4 to FIG. 6 are merely examples but not a limitation.

In this application, the first preset condition may include only any one of the condition (a), the condition (b), the condition (c), the condition (d), and the condition (e), or the first preset condition may include all or a plurality of the condition (a), the condition (b), the condition (c), the condition (d), and the condition (e). This is not limited in this embodiment of this application.

In other words, in step 221, a candidate resource may be excluded from the candidate resource set on the first carrier based on only the condition (a), the condition (b), the condition (c), the condition (d), or the condition (e), or a candidate resource may be successively excluded based on all or a plurality of the condition (a), the condition (b), the condition (c), the condition (d), or the condition (e).

For example, in step 221, a candidate resource is first excluded from the candidate resource set based on one of the condition (a), the condition (b), the condition (c), the condition (d), and the condition (e), to obtain a candidate resource subset A, then a candidate resource is excluded from the candidate resource subset A based on another condition of the condition (a), the condition (b), the condition (c), the condition (d), and the condition (e), to obtain a candidate resource subset B, and so on until a candidate resource is excluded from the candidate resource set based on each of the condition (a), the condition (b), the condition (c), the condition (d), and the condition (e), to obtain the first candidate resource subset.

For another example, in step 221, for each time domain resource included in the candidate resource set, a candidate resource is excluded by using the condition (a), the condition (b), the condition (c), the condition (d), and the condition (e) one by one, to obtain the first candidate resource subset.

For example, the candidate resource set includes candidate resources on time domain resources n1, n2, and n3. For the time domain resource n1, a candidate resource is excluded by using the condition (a), the condition (b), the condition (c), the condition (d), and the condition (e) one by one. When the time domain resource n1 meets at least one of these conditions, all candidate resources on the time domain resource n1 are excluded from the candidate resource set. Processing is performed for the time domain resource n2 and the time domain resource n3 in a similar method.

Specifically, in step 221, a candidate resource may be excluded from the candidate resource set based on a plurality of combinations of the condition (a), the condition (b), the condition (c), the condition (d), and the condition (e). The plurality of combinations may include the following combinations.

Combination 1: A Combination of the Condition (a) and the Condition (b)

It should be understood that in the candidate resource set, a candidate resource that does not meet the condition (a) may meet the condition (b), or a candidate resource that does not meet the condition (b) may meet the condition (a). Therefore, both the condition (a) and the condition (b) are considered, so that on a resource in the first candidate resource subset obtained after exclusion, a case does not occur in which some data cannot be sent because of limitations of the quantity of transmit chains and the transmit power.

It should be noted that a candidate resource can be excluded provided that the candidate resource meets one of the condition (a) and the condition (b), and a resource that meets both the condition (a) and the condition (b) can be excluded through determining only once without being determined by using the condition (a) and the condition (b) separately.

Combination 2: A Combination of the Condition (a) and the Condition (c)

It should be understood that in the candidate resource set, a candidate resource that does not meet the condition (a) may meet the condition (c), or a candidate resource that does not meet the condition (c) may meet the condition (a). Therefore, both the condition (a) and the condition (c) are considered, so that on a resource in the first candidate resource subset obtained after exclusion, a case does not occur in which some data cannot be sent because of limitations of the quantity of transmit chains and the quantity of occupied resource blocks.

It should be noted that a candidate resource can be excluded provided that the candidate resource meets one of the condition (a) and the condition (c), and a resource that meets both the condition (a) and the condition (c) can be excluded through determining only once without being determined by using the condition (a) and the condition (c) separately.

Combination 3: A Combination of the Condition (a) and the Condition (d)

It should be understood that in the candidate resource set, a candidate resource that does not meet the condition (a) may meet the condition (d), or a candidate resource that does not meet the condition (d) may meet the condition (a). Therefore, both the condition (a) and the condition (d) are considered, so that on a resource in the first candidate resource subset obtained after exclusion, a case does not occur in which some data cannot be sent because of limitations of the quantity of transmit chains and an adjacent carrier.

It should be noted that a candidate resource can be excluded provided that the candidate resource meets one of the condition (a) and the condition (d), and a resource that meets both the condition (a) and the condition (d) can be excluded through determining only once without being determined by using the condition (a) and the condition (d) separately.

Combination 4: A Combination of the Condition (a) and the Condition (e)

It should be understood that in the candidate resource set, a candidate resource that does not meet the condition (a) may meet the condition (e), or a candidate resource that does not meet the condition (e) may meet the condition (a). Therefore, both the condition (a) and the condition (e) are considered, so that on a resource in the first candidate resource subset obtained after exclusion, a case does not occur in which some data cannot be sent because of limitations of the quantity of transmit chains and the carrier switching time.

It should be noted that a candidate resource can be excluded provided that the candidate resource meets one of the condition (a) and the condition (e), and a resource that meets both the condition (a) and the condition (e) can be excluded through determining only once without being determined by using the condition (a) and the condition (e) separately.

Combination 5: A Combination of the Condition (b) and the Condition (c)

It should be understood that in the candidate resource set, a candidate resource that does not meet the condition (b) may meet the condition (c), or a candidate resource that does not meet the condition (c) may meet the condition (b). Therefore, both the condition (b) and the condition (c) are considered, so that on a resource in the first candidate resource subset obtained after exclusion, a case does not occur in which some data cannot be sent because of limitations of the transmit power and the quantity of occupied resource blocks.

It should be noted that a candidate resource can be excluded provided that the candidate resource meets one of the condition (b) and the condition (c), and a resource that meets both the condition (b) and the condition (c) can be excluded through determining only once without being determined by using the condition (b) and the condition (c) separately.

Combination 6: A Combination of the Condition (b) and the Condition (d)

It should be understood that in the candidate resource set, a candidate resource that does not meet the condition (b) may meet the condition (d), or a candidate resource that does not meet the condition (d) may meet the condition (b). Therefore, both the condition (b) and the condition (d) are considered, so that on a resource in the first candidate resource subset obtained after exclusion, a case does not occur in which some data cannot be sent because of limitations of the transmit power and an adjacent carrier.

It should be noted that a candidate resource can be excluded provided that the candidate resource meets one of the condition (b) and the condition (d), and a resource that meets both the condition (b) and the condition (d) can be excluded through determining only once without being determined by using the condition (b) and the condition (d) separately.

Combination 7: A Combination of the Condition (b) and the Condition (e)

It should be understood that in the candidate resource set, a candidate resource that does not meet the condition (b) may meet the condition (e), or a candidate resource that does not meet the condition (e) may meet the condition (b). Therefore, both the condition (b) and the condition (e) are considered, so that on a resource in the first candidate resource subset obtained after exclusion, a case does not occur in which some data cannot be sent because of limitations of the transmit power and the carrier switching time.

It should be noted that a candidate resource can be excluded provided that the candidate resource meets one of the condition (b) and the condition (e), and a resource that meets both the condition (b) and the condition (e) can be excluded through determining only once without being determined by using the condition (b) and the condition (e) separately.

Combination 8: A Combination of the Condition (c) and the Condition (d)

It should be understood that in the candidate resource set, a candidate resource that does not meet the condition (c) may meet the condition (d), or a candidate resource that does not meet the condition (d) may meet the condition (c). Therefore, both the condition (c) and the condition (d) are considered, so that on a resource in the first candidate resource subset obtained after exclusion, a case does not occur in which some data cannot be sent because of limitations of the quantity of occupied resource blocks and an adjacent carrier.

It should be noted that a candidate resource can be excluded provided that the candidate resource meets one of the condition (c) and the condition (d), and a resource that meets both the condition (c) and the condition (d) can be excluded through determining only once without being determined by using the condition (c) and the condition (d) separately.

Combination 9: A Combination of the Condition (c) and the Condition (e)

It should be understood that in the candidate resource set, a candidate resource that does not meet the condition (c) may meet the condition (e), or a candidate resource that does not meet the condition (e) may meet the condition (c). Therefore, both the condition (c) and the condition (e) are considered, so that on a resource in the first candidate resource subset obtained after exclusion, a case does not occur in which some data cannot be sent because of limitations of the quantity of occupied resource blocks and the carrier switching time.

It should be noted that a candidate resource can be excluded provided that the candidate resource meets one of the condition (c) and the condition (e), and a resource that meets both the condition (c) and the condition (e) can be excluded through determining only once without being determined by using the condition (c) and the condition (e) separately.

Combination 10: A Combination of the Condition (d) and the Condition (e)

It should be understood that in the candidate resource set, a candidate resource that does not meet the condition (d) may meet the condition (e), or a candidate resource that does not meet the condition (e) may meet the condition (d). Therefore, both the condition (d) and the condition (e) are considered, so that on a resource in the first candidate resource subset obtained after exclusion, a case does not occur in which some data cannot be sent because of limitations of an adjacent carrier and the carrier switching time.

It should be noted that a candidate resource can be excluded provided that the candidate resource meets one of the condition (d) and the condition (e), and a resource that meets both the condition (d) and the condition (e) can be excluded through determining only once without being determined by using the condition (d) and the condition (e) separately.

Combination 11: A Combination of the Condition (a), the Condition (b), and the Condition (c)

It should be understood that in the candidate resource set, a candidate resource that does not meet one of the condition (a), the condition (b), and the condition (c) may meet the other one or two of the condition (a), the condition (b), and the condition (c). Therefore, the condition (a), the condition (b), and the condition (c) are all considered, so that on a resource in the first candidate resource subset obtained after exclusion, a case does not occur in which some data cannot be sent because of limitations of the quantity of transmit chains, the transmit power, and the quantity of occupied resource blocks.

It should be noted that a candidate resource can be excluded provided that the candidate resource meets one of the condition (a), the condition (b), and the condition (c), and a resource that meets all of the condition (a), the condition (b), and the condition (c) can be excluded through determining only once without being determined by using the condition (a), the condition (b), and the condition (c) separately.

Combination 12: A Combination of the Condition (a), the Condition (b), and the Condition (d)

It should be understood that in the candidate resource set, a candidate resource that does not meet one of the condition (a), the condition (b), and the condition (d) may meet the other one or two of the condition (a), the condition (b), and the condition (d). Therefore, the condition (a), the condition (b), and the condition (d) are all considered, so that on a resource in the first candidate resource subset obtained after exclusion, a case does not occur in which some data cannot be sent because of limitations of the quantity of transmit chains, the transmit power, and an adjacent carrier.

It should be noted that a candidate resource can be excluded provided that the candidate resource meets one of the condition (a), the condition (b), and the condition (d), and a resource that meets all of the condition (a), the condition (b), and the condition (d) can be excluded through determining only once without being determined by using the condition (a), the condition (b), and the condition (d) separately.

Combination 13: A Combination of the Condition (a), the Condition (b), and the Condition (e)

It should be understood that in the candidate resource set, a candidate resource that does not meet one of the condition (a), the condition (b), and the condition (e) may meet the other one or two of the condition (a), the condition (b), and the condition (e). Therefore, the condition (a), the condition (b), and the condition (e) are all considered, so that on a resource in the first candidate resource subset obtained after exclusion, a case does not occur in which some data cannot be sent because of limitations of the quantity of transmit chains, the transmit power, and the carrier switching time.

It should be noted that a candidate resource can be excluded provided that the candidate resource meets one of the condition (a), the condition (b), and the condition (e), and a resource that meets all of the condition (a), the condition (b), and the condition (e) can be excluded through determining only once without being determined by using the condition (a), the condition (b), and the condition (e) separately.

Combination 14: A Combination of the Condition (a), the Condition (b), the Condition (d), and the Condition (e)

It should be understood that in the candidate resource set, a candidate resource that does not meet one of the condition (a), the condition (b), the condition (d), and the condition (e) may meet the other one or two or three of the condition (a), the condition (b), the condition (d), and the condition (e). Therefore, the condition (a), the condition (b), the condition (d), and the condition (e) are all considered, so that on a resource in the first candidate resource subset obtained after exclusion, a case does not occur in which some data cannot be sent because of limitations of the quantity of transmit chains, the transmit power, an adjacent carrier, and the carrier switching time.

It should be noted that a candidate resource can be excluded provided that the candidate resource meets one of the condition (a), the condition (b), the condition (d), and the condition (e), and a resource that meets all of the condition (a), the condition (b), the condition (d), and the condition (e) can be excluded through determining only once without being determined by using the condition (a), the condition (b), the condition (d), and the condition (e) separately.

Combination 15: A Combination of the Condition (a), the Condition (b), the Condition (c), the Condition (d), and the Condition (e)

It should be understood that in the candidate resource set, a candidate resource that does not meet one of the condition (a), the condition (b), the condition (c), the condition (d), and the condition (e) may meet the other one or two or three or four of the five conditions. Therefore, the five conditions are all considered, so that on a resource in the first candidate resource subset obtained after exclusion, a case does not occur in which some data cannot be sent because of limitations of the quantity of transmit chains, the transmit power, the quantity of occupied resource blocks, an adjacent carrier, and the carrier switching time.

It should be noted that a candidate resource can be excluded provided that the candidate resource meets one of the five conditions, and a resource that meets all of the five conditions can be excluded through determining only once without being determined by using the five conditions separately.

It should be understood that although not all combinations of the condition (a), the condition (b), the condition (c), the condition (d), and the condition (e) are listed above, these combinations fall within the protection scope of this application.

It should be further noted that the foregoing described various combinations of the condition (a), the condition (b), the condition (c), the condition (d), and the condition (e) are merely examples but not a limitation. In actual application, in step 221, which one or more of the condition (a), the condition (b), the condition (c), the condition (d), and the condition (e) are to be used may be determined based on an actual requirement, may be preconfigured on the UE, or may be configured by the eNB for the UE. This is not limited in this embodiment of this application.

Optionally, step 221 specifically includes: for each time domain resource in the candidate resource set, excluding, by the UE, all candidate resources on one time domain resource once there is an intersection between the one time domain resource and a time domain resource in the selected resources, to obtain the first candidate resource subset.

In this embodiment of this application, in a process of selecting a resource on the first carrier, a candidate resource that has an intersection with the selected resources in time domain is directly excluded, and then a resource on the first carrier is selected from a subset obtained after the exclusion, so that resource selection efficiency can be improved.

Optionally, step 222 specifically includes 222a: The UE randomly selects a resource on the first carrier from the first candidate resource subset.

In this embodiment, a resource is excluded from the candidate resource set on the first carrier based on one or more of the condition (a), the condition (b), the condition (c), the condition (d), and the condition (e), and then a resource on the first carrier is randomly selected from resources obtained after the exclusion, so that on the selected resource, a case does not occur in which some data cannot be sent because of limitations of one or more of the following information: the quantity of transmit chains, the transmit power, the quantity of occupied resource blocks, an adjacent carrier, and the carrier switching time. Therefore, in this embodiment, data transmission reliability can be improved, and further, safety of a vehicle can be improved.

Figure 7:
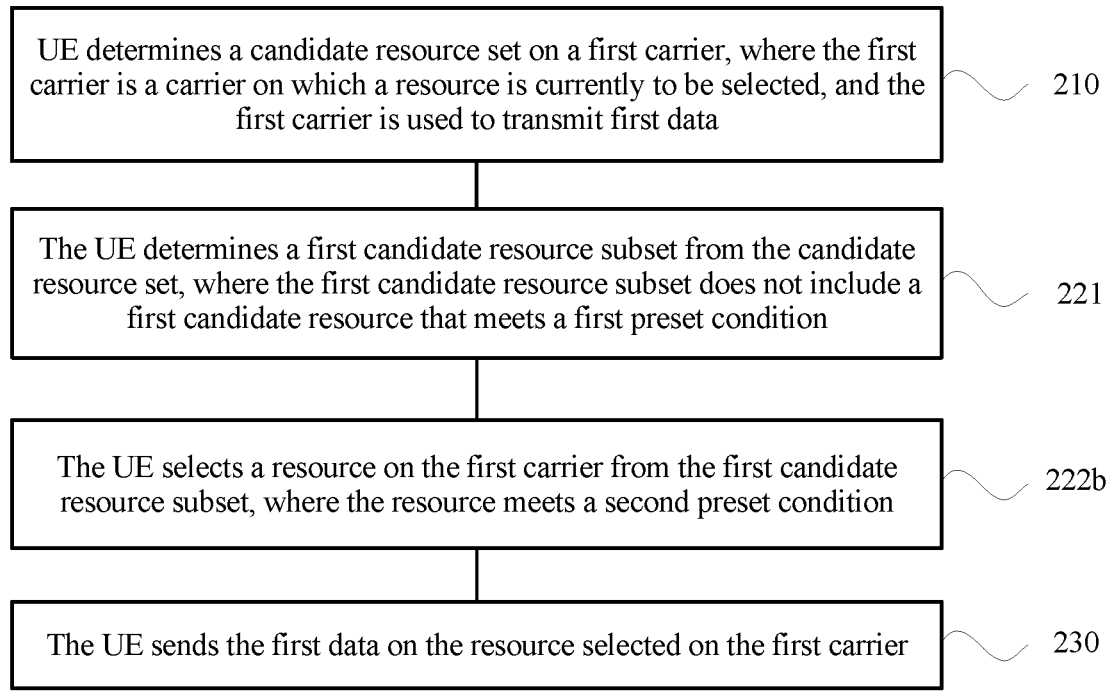
FIG. 7 is a schematic flowchart of a communication method according to still another embodiment of this application.

Optionally, the preset condition includes a second preset condition. As shown in FIG. 7, step 222 specifically includes 222b: The UE selects a resource on the first carrier from the first candidate resource subset, where the resource meets the second preset condition. The second preset condition is that there is an intersection between a time domain resource of the resource and a time domain resource of a third selected resource in the selected resources.

Optionally, in an embodiment, step 222b specifically includes: selecting, by the UE from the first candidate resource subset, a resource that meets the second preset condition as a resource selected on the first carrier.

Figure 8:
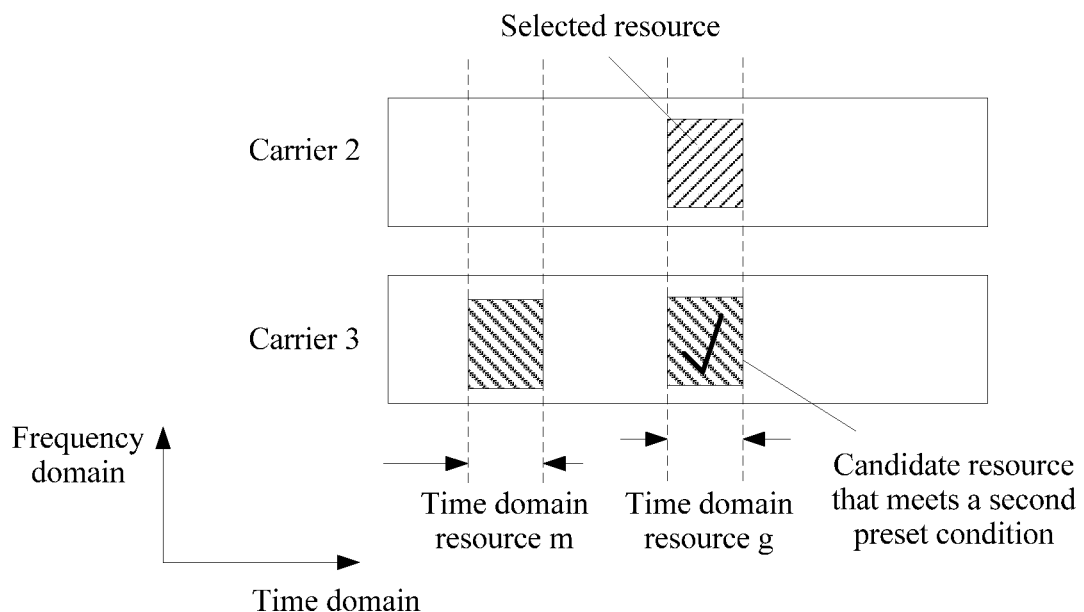
FIG. 8 is still another schematic diagram of selecting a resource according to an embodiment of this application.

For example, as shown in FIG. 8, the UE has two carriers (a carrier 2 and a carrier 3). A resource has been selected on the carrier 2, and the carrier 3 is a carrier on which a resource is currently to be selected. The UE selects a resource from a candidate resource set on the carrier 3, and the UE determines all time domain resources included in the candidate resource set one by one. The UE excludes each candidate resource on a time domain resource that meets the first preset condition from the candidate resource set, to obtain a first candidate resource subset. The first candidate resource subset includes a time domain resource m and a time domain resource g (as shown in FIG. 8). The UE determines that the selected resource on the carrier 2 includes a resource (for example, a selected resource shown in FIG. 8) on the time domain resource g, but does not include a resource on the time domain resource m. Therefore, a candidate resource on the time domain resource g in the first candidate resource subset meets the second preset condition, and the candidate resource is used as a resource selected on the carrier 3.

In this embodiment, a resource is excluded from the candidate resource set on the first carrier based on the first preset condition, and then a candidate resource that meets the second preset condition is selected, from resources obtained after the exclusion, as a resource selected on the first carrier. Therefore, on the selected resource, a case does not occur in which some data cannot be sent because of limitations of one or more of the following information: the quantity of transmit chains, the transmit power, the quantity of occupied resource blocks, an adjacent carrier, and the carrier switching time. In addition, resources used by the UE to send data can be reduced to some extent, and resources used to receive data are increased accordingly. In this way, the half-duplex limitation to the UE can be overcome, data transmission reliability can be improved, and further, safety of a vehicle can be improved.

Optionally, in another embodiment, step 222b specifically includes: determining, by the UE, a second candidate resource subset from the first candidate resource subset, where each candidate resource in the second candidate resource subset meets the second preset condition; and selecting, by the UE, a resource on the first carrier from the second candidate resource subset based on one or more of the following attributes of a resource in the selected resources that corresponds to each candidate resource in the second candidate resource subset: a quantity of occupied carriers or frequency bands, an amount of to-be-sent data, a quantity of occupied resource blocks, and a priority of the to-be-sent data, where the resource in the selected resources that corresponds to each candidate resource in the second candidate resource subset indicates a resource in the selected resources that has an intersection with the candidate resource in the second candidate resource subset in terms of time domain resources.

For example, the UE has three carriers (a carrier 1, a carrier 2, and a carrier 3). Resources have been selected on the carrier 1 and the carrier 2, and the carrier 3 is a carrier on which a resource is currently to be selected. The UE selects a resource from a candidate resource set on the carrier 3, and the UE determines all time domain resources included in the candidate resource set one by one. The UE excludes each candidate resource on a time domain resource that meets the first preset condition from the candidate resource set, to obtain a first candidate resource subset, and determines a second candidate resource subset from the first candidate resource subset. Each candidate resource in the second candidate resource subset meets the second preset condition. The second candidate resource subset includes a time domain resource m and a time domain resource g. The UE determines that on the time domain resource m, resources have been separately selected on the carrier 1 and the carrier 2, in other words, two pieces of data need to be transmitted on the time domain resource m, but on the time domain resource g, one resource has been selected on the carrier 1 and no resource has been selected on the carrier 2, in other words, one piece of data needs to be transmitted on the time domain resource g. By comparing the resources selected on the time domain resource m and the resource selected on the time domain resource g in terms of a quantity of occupied carriers or frequency bands, an amount of to-be-sent data, a quantity of occupied resource blocks, or a priority of the to-be-sent data, the UE uses a candidate resource on the time domain resource m or the time domain resource g in the second candidate resource subset as a resource selected on the first carrier.

Optionally, in the foregoing example, the UE may preferentially select a candidate resource on the time domain resource g in the second candidate resource subset as a resource selected on the first carrier. Because only one piece of data needs to be sent on the time domain resource g (or one carrier, namely, the carrier 1, is occupied), and two pieces of data need to be sent on the time domain resource m (or two carriers, namely, the carrier 1 and the carrier 2, are occupied), the UE preferentially selects a time domain resource on which a smaller amount of data needs to be sent or that occupies a smaller quantity of carriers.

Optionally, in the foregoing example, the UE may preferentially select, from the time domain resource m or the time domain resource g, a time domain resource that occupies a smaller quantity of physical resources. For example, if a total of ten resources are occupied by the resources selected on the time domain resource m, and a total of eight physical resources are occupied by the resource selected on the time domain resource g, the UE preferentially selects a candidate resource on the time domain resource g in the second candidate resource subset as a resource selected on the first carrier. The physical resource may be a physical resource block, a subcarrier, a subchannel, or the like.

Optionally, in the foregoing example, the UE may preferentially select, from the time domain resource m or the time domain resource g, a time domain resource on which to-be-sent data with a lower priority needs to be sent. For example, if a priority of each (or at least one) of the two pieces of to-be-sent data on the time domain resource m is greater than a priority of the to-be-sent data on the time domain resource g, the UE preferentially selects a candidate resource on the time domain resource g in the second candidate resource subset as a resource selected on the first carrier, in other words, the UE preferentially selects a time domain resource on which data with a lower highest priority needs to be sent.

It should be understood that in this example, two time domain resources m and g in the second candidate resource subset are used as examples for description, and when the second candidate resource subset includes a plurality of time domain resources, sorting may be first performed before selection is performed in the foregoing manner.

In this embodiment, a resource is excluded from the candidate resource set on the first carrier based on the first preset condition, and then a candidate resource that meets the second preset condition is selected, from resources obtained after the exclusion, as a resource selected on the first carrier. Therefore, on the selected resource, a case does not occur in which some data cannot be sent because of limitations of one or more of the following information: the quantity of transmit chains, the transmit power, the quantity of occupied resource blocks, an adjacent carrier, and the carrier switching time. In addition, resources used by the UE to send data can be reduced to some extent, and resources used to receive data are increased accordingly. In this way, the half-duplex limitation to the UE can be overcome, data transmission reliability can be improved, and further, safety of a vehicle can be improved.

Optionally, in some embodiments, if the first candidate resource subset includes no candidate resource that meets the second preset condition, the UE randomly selects a resource on the first carrier from the first candidate resource sub set.

It can be learned from the foregoing description that the first preset condition is used as a condition for excluding a resource from the candidate resource set (the first candidate resource subset is obtained after the exclusion), and the second preset condition is used as a condition for selecting a resource from the first candidate resource subset.

It should be noted that in some embodiments, a limitation of an adjacent carrier may also be used as a condition for carrier selection. When selecting a carrier, the UE preferentially selects a carrier adjacent to a carrier on which a resource has been selected, and after the carrier selection, performs resource selection without further considering the condition (d). In this way, resource selection on a carrier is simpler, and more time domain resources are available for selection.

Optionally, in another embodiment, the preset condition includes a second preset condition. Step 220 shown in FIG. 2 further includes: selecting, by the UE, the resource on the first carrier from the candidate resource set, where the resource meets the second preset condition. The second preset condition is that there is an intersection between a time domain resource of the resource and a time domain resource of a fourth selected resource in the selected resources.

Specifically, the UE selects, from the candidate resource set, a resource that meets the second preset condition as a resource selected on the first carrier.

Optionally, in this embodiment, step 220 specifically includes: determining, by the UE, a third candidate resource subset from the candidate resource set, where each candidate resource in the third candidate resource subset meets the second preset condition; and selecting, by the UE, a resource on the first carrier from the third candidate resource subset based on one or more of the following attributes of a resource in the selected resources that corresponds to each candidate resource in the third candidate resource subset: a quantity of occupied carriers or frequency bands, an amount of to-be-sent data, a quantity of occupied resource blocks, and a priority of the to-be-sent data, where the resource in the selected resources that corresponds to each candidate resource in the third candidate resource subset indicates a resource in the selected resources that has an intersection with the candidate resource in the third candidate resource subset in terms of time domain resources.

In this embodiment, a resource on the first carrier is selected from the candidate resource set on the first carrier based on the second preset condition, and the second preset condition indicates that there is an intersection between the selected resource and the selected resources in time domain. Therefore, resources used by the UE to send data can be reduced to some extent, and resources used to receive data are increased accordingly. In this way, the half-duplex limitation to the UE can be overcome, data transmission reliability can be improved, and further, safety of a vehicle can be improved.

In the embodiment described above, resource selection on a carrier on which a resource is selected next is affected by resource selection on a carrier on which a resource is selected first. In actual application, in some cases, resource selection on a carrier on which a resource is selected first may also vary with resource selection on a carrier on which a resource is selected next.

Optionally, in some of the foregoing embodiments, there is no intersection between a candidate resource in the first candidate resource subset and the selected resources in terms of time domain resources, and a time domain resource of the resource selected on the first carrier is a first time domain resource. After the UE selects the resource on the first carrier, before the UE sends the first data by using the resource selected on the first carrier, the communication method further includes: selecting, by the UE, a resource on a second carrier, where a time domain resource of the resource selected on the second carrier is a second time domain resource, and there is no intersection between the second time domain resource and the first time domain resource; and when determining that the first candidate resource subset includes a candidate resource that has an intersection with the second time domain resource in time domain, reselecting, by the UE, a resource on the first carrier, so that there is an intersection between the resource selected on the first carrier and the second time domain resource in time domain.

Figure 9:
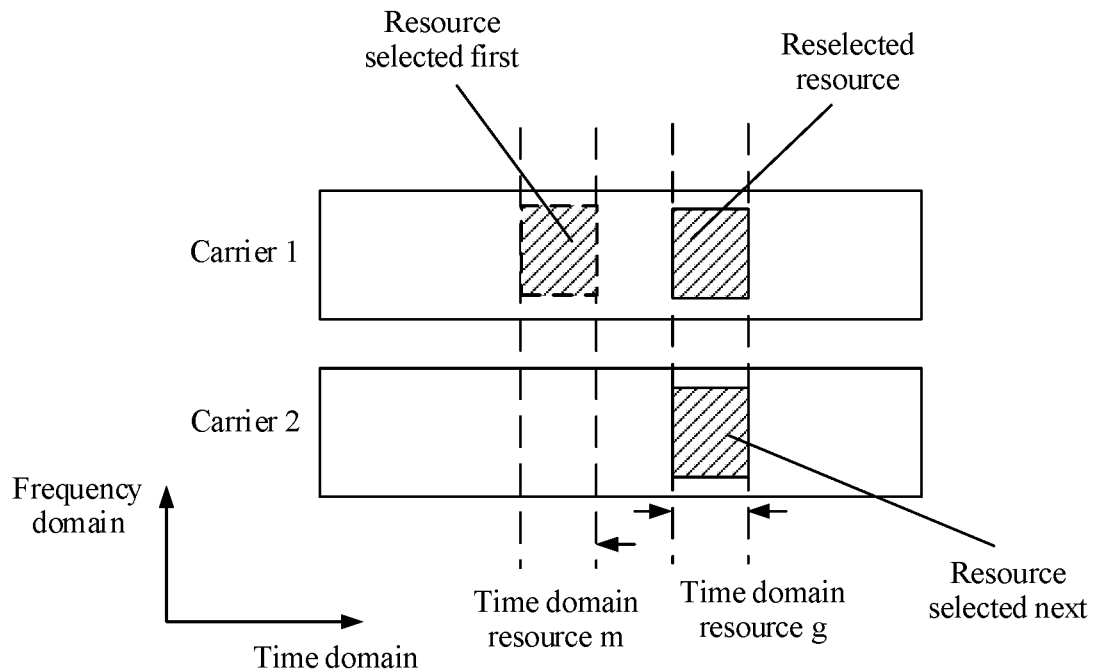
FIG. 9 is still another schematic diagram of selecting a resource according to an embodiment of this application.

For example, as shown in FIG. 9, in a process of selecting a resource on a carrier 1, a first candidate resource subset on the carrier 1 includes candidate resources on a time domain resource m and a time domain resource g. The UE determines that the first candidate resource subset does not include a time domain resource that meets the second preset condition, in other words, on the time domain resource m and the time domain resource g, the UE does not select a resource on another carrier. The UE finally selects (for example, randomly selects) a candidate resource on the time domain resource m as a resource selected on the carrier 1, to send data 1.

After selecting the resource on the carrier 1, before sending the data 1 by using the carrier 1, the UE starts to select a resource on a carrier 2, and selects a resource on the time domain resource g on the carrier 2 to send data 2. If the UE determines that the time domain resource g is also in the first candidate resource subset for selecting a resource for the data 1, the UE reselects a candidate resource on the time domain resource g on the carrier 1 as a resource selected on the carrier 1, to send the data 1.

Further, it may be determined, based on the first preset condition in step 221, whether the data 1 can be sent on a resource on the time domain resource g. In other words, it is determined, based on the first preset condition, whether reselection can be performed for a first selected resource.

Specifically, exclusion may be further performed based on the conditions (a) to (e) during determining. If one of the conditions is met, reselection cannot be performed for the first selected resource.

It should be understood that in this example, a first selected resource is used as an example for description, and when there are a plurality of first selected resources, it may be successively determined, in ascending order of a distance from the time domain resource g, whether reselection can be performed.

Optionally, in some of the foregoing embodiments, there is no intersection between a candidate resource in the first candidate resource subset and the selected resources in terms of time domain resources, and a time domain resource of the resource selected on the first carrier is a first time domain resource. After the UE selects the resource on the first carrier, before the UE sends the first data by using the resource selected on the first carrier, the communication method further includes: in a process of selecting a resource on a third carrier, determining, by the UE, that there is an intersection between a third time domain resource in a candidate resource set on the third carrier and a fourth time domain resource in the first candidate resource subset, where there is no intersection between the fourth time domain resource and the first time domain resource; determining, by the UE, a candidate resource on the third time domain resource on the third carrier as a resource selected on the third carrier; and re-determining, by the UE, a candidate resource on the fourth time domain resource in the first candidate resource subset as a resource selected on the first carrier.

For example, still as shown in FIG. 9, in a process of selecting a resource on a carrier 1, a first candidate resource subset on the carrier 1 includes candidate resources on a time domain resource m and a time domain resource g. The UE determines that the first candidate resource subset does not include a time domain resource that meets the second preset condition, in other words, on the time domain resource m and the time domain resource g, the UE does not select a resource on another carrier. The UE finally selects (for example, randomly selects) a candidate resource on the time domain resource m as a resource selected on the carrier 1, to send data 1.

After selecting the resource on the carrier 1, before sending the data 1 by using the carrier 1, the UE starts to select a resource on a carrier 2. In a process of selecting a resource on the carrier 2, the UE determines that there is an intersection between a first candidate resource subset on the carrier 2 and the first candidate resource subset on the carrier 1, and the intersection includes only the time domain resource g. In this case, the UE determines a resource on the time domain resource g on the carrier 2 as a resource selected on the carrier 2, and reselects a candidate resource on the time domain resource g on the carrier 1 as a resource selected on the carrier 1, to send the data 1.

Further, it may be determined, based on the first preset condition in step 221, whether the data 1 can be sent on a resource on the time domain resource g. In other words, it is determined, based on the first preset condition, whether reselection can be performed for a first selected resource.

Specifically, exclusion may be further performed based on the conditions (a) to (e) during determining. If one of the conditions is met, reselection cannot be performed for the first selected resource.

Therefore, in this embodiment, a resource selected first may vary with a resource selected next, so that time domain resources used by the UE to send data can be further reduced, and time domain resources used to receive data are increased accordingly. In this way, receiving performance of the UE can be improved, data transmission reliability can also be improved, and further, safety of a vehicle can be improved.

It should be further noted that in a resource selection process, it is inevitable that different frequency domain resources are selected on a same time domain resource to send a plurality of pieces of data. In this case, a sum of independently determined powers of all pieces of data may be greater than a maximum transmit power of the UE. Power allocation may be successively performed in descending order of priorities of the pieces of data. For example, a power is first allocated to data with a highest priority, and if there is a power left after the allocation, a power is allocated to data with a second highest priority, until no power is left. When a power P1 obtained by data is less than a power P2 independently determined in a normal case, in one manner, the data is directly sent at the power P1, and during sending, the power P1 is further allocated between SA and the data. Optionally, a power may be first allocated to the SA, and a remaining power is allocated to the data, so that at least performance of the SA can be ensured; or a power allocated to the SA is 3 dB greater than a power corresponding to the data; or powers are increased or reduced proportionally. In another manner, the data is discarded and not sent. When a plurality of pieces of data need to be sent on a same time domain resource on a plurality of carriers on a sidelink, and data also needs to be sent on an uplink, the UE may perform sorting based on all of a priority of the data on the uplink and priorities of the pieces of data on the sidelink, and then allocate a power to each piece of data based on the priorities in the foregoing manner. Optionally, a maximum difference between different data powers may be further considered during power allocation. If a difference between different data powers is extremely large, more serious interference is caused to another UE because of third-order intermodulation or the like. Specifically, for example, power allocation may be successively performed in descending order of priorities of data according to the foregoing rule. Each time a power is allocated to a piece of data, it is determined whether a difference between the power of the data and a power of data to which a power has been previously allocated meets Q. If the difference does not meet Q, the data is discarded or not sent, and a power continues to be allocated to a next piece of data. For example, resources are respectively selected on a carrier 1, a carrier 2, and a carrier 3 on a time domain resource n to send data 1, data 2, and data 3. When no power limitation between a plurality of pieces of data is considered, assuming that powers required by the three pieces of data are respectively P1, P2, and P3, a maximum transmit power of the UE is P, and the three pieces of data are the data 1, the data 2, and the data 3 in descending order of priorities, a power is first allocated to the data 1 with a highest priority. Assuming that P1<P, the power allocated to the data 1 is P1. Then a power is allocated to the data 2 with a second highest priority. Assuming that P1+P2>P, the power allocated to the data 2 is P−P1, but the data 2 needs to be discarded or not sent because |P1−(P−P1)|>Q. Then a power continues to be allocated to the data 3 in such a manner. In this way, a problem caused by an extremely large difference between different data of the UE can be avoided. Further, when power backoff needs to be considered, assuming that a power back-off value is P', P in the foregoing expression is replaced with P−P'.

Figure 10:
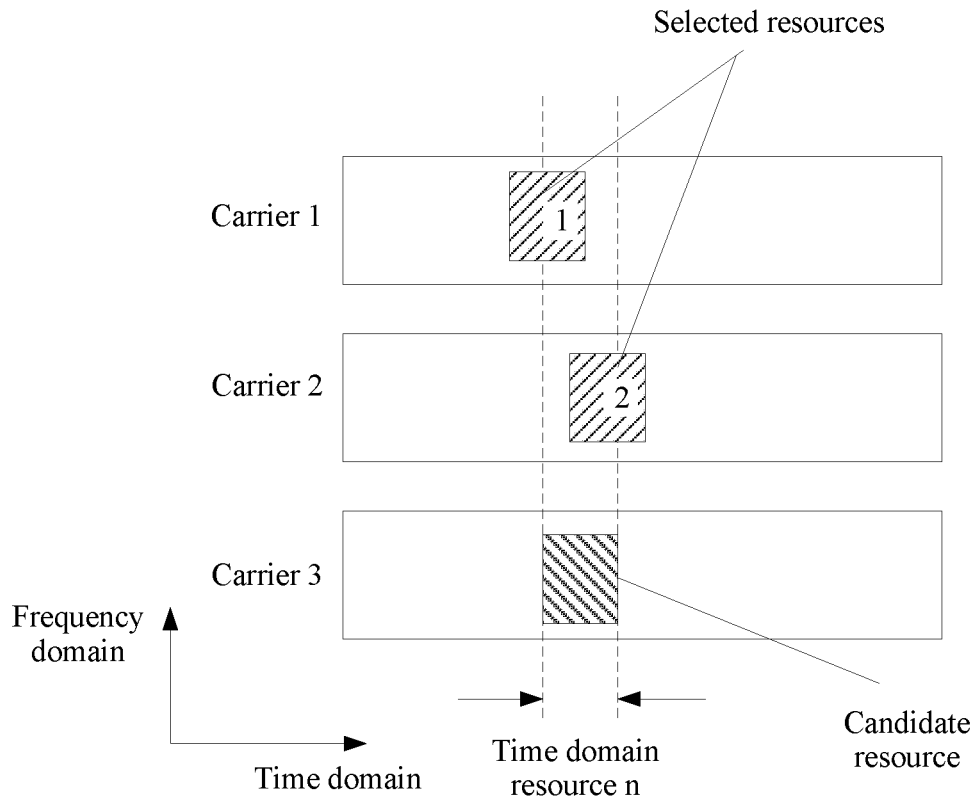
FIG. 10 is still another schematic diagram of selecting a resource according to an embodiment of this application.

It should be further noted that in the foregoing descriptions with reference to FIG. 4 to FIG. 6, FIG. 8, and FIG. 9, the following expression "the UE selects a resource on another carrier on the time domain resource n" is involved. The time domain resource n herein is a time domain resource on a carrier (corresponding to the first carrier) on which a resource is currently being selected. It should be understood that boundaries of time domain resources on different carriers may be unaligned, or start positions of occupied time domain resources are different. To be specific, on the time domain resource n on which a resource is currently being selected, a resource selected by the UE on another carrier may occupy only a part of the time domain resource n, in other words, a time domain resource occupied by the resource selected on the another carrier overlaps but is not totally consistent with the time domain resource n in time domain. In this case, it is still considered that the UE has selected a resource on the another carrier on the time domain resource n of the current carrier. As shown in FIG. 10, a carrier 3 is a carrier on which a resource is currently being selected, and a candidate resource set on the carrier 3 includes a time domain resource n. There is an intersection between a time domain resource of a selected resource on a carrier 1 and the time domain resource n, but the two time domain resources do not coincide with each other. In this case, it is also considered that the UE has selected a resource on the carrier 1 on the time domain resource n. There is an intersection between a time domain resource of a selected resource on a carrier 2 and the time domain resource n, but the two time domain resources do not coincide with each other. In this case, it is also considered that the UE has selected a resource on the carrier 2 on the time domain resource n.

The foregoing describes the method embodiment of this application, and the following describes apparatus embodiments of this application. It should be understood that descriptions of the apparatus embodiments correspond to the descriptions of the method embodiment, and therefore for content that is not described in detail, refer to the foregoing method embodiment.

Figure 11:
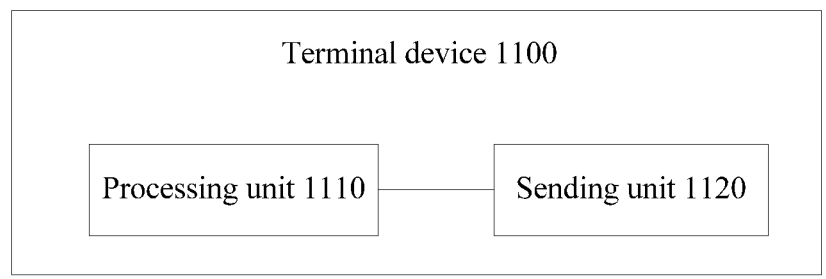
FIG. 11 is a schematic block diagram of a terminal device according to an embodiment of this application.

FIG. 11 is a schematic block diagram of a terminal device 1100 according to an embodiment of this application. The terminal device 1100 may correspond to the UE in the foregoing method embodiment. As shown in FIG. 11, the terminal device 1100 includes:

a processing unit 1110, configured to determine a candidate resource set on a first carrier, where the first carrier is a carrier on which a resource is currently to be selected, and the first carrier is used to transmit first data, where the processing unit 1110 is further configured to select a resource on the first carrier from the candidate resource set based on a preset condition, where the preset condition is determined based on selected resources of the terminal device on other carriers and one or more of the following information of the terminal device: a quantity of transmit chains of the terminal device, a transmit power of the terminal device, a quantity of resource blocks occupied by the terminal device, a frequency domain spacing between a plurality of carriers or a plurality of frequency domain resources occupied by the terminal device, a carrier switching time of the terminal device, and a half-duplex limitation to the terminal device, the other carriers indicate all carriers on which the terminal device has currently selected a resource, and the other carriers are used to transmit second data; and a sending unit 1120, configured to send the first data on the resource selected on the first carrier.

Optionally, in some embodiments, the preset condition includes a first preset condition, and the processing unit 1110 is specifically configured to: determine a first candidate resource subset from the candidate resource set, where the first candidate resource subset does not include a first candidate resource that meets the first preset condition; and select a resource on the first carrier from the first candidate resource subset, where that the first candidate resource meets the first preset condition indicates that there is an intersection between a time domain resource of the first candidate resource and a time domain resource of a first selected resource in the selected resources, and the first selected resource meets a condition determined based on one or more of the following information of the terminal device: the quantity of transmit chains of the terminal device, the transmit power of the terminal device, the quantity of resource blocks occupied by the terminal device, and the frequency domain spacing between the plurality of carriers or the plurality of frequency domain resources occupied by the terminal device; and/or that the first candidate resource meets the first preset condition indicates that there is no intersection between the time domain resource of the first candidate resource and a time domain resource of a second selected resource in the selected resources, and a time domain spacing between the first candidate resource and the second selected resource meets a condition determined based on the carrier switching time of the terminal device.

Optionally, in some embodiments, the processing unit 1110 is specifically configured to: for each time domain resource in the candidate resource set, exclude all candidate resources on one time domain resource from the candidate resource set once the one time domain resource meets the first preset condition, to determine the first candidate resource subset, where that the one time domain resource meets the first preset condition indicates that there is an intersection between the one time domain resource and the time domain resource of the first selected resource in the selected resources, and the first selected resource meets the condition determined based on one or more of the following information of the terminal device: the quantity of transmit chains of the terminal device, the transmit power of the terminal device, the quantity of resource blocks occupied by the terminal device, and the frequency domain spacing between the plurality of carriers or the plurality of frequency domain resources occupied by the terminal device; and/or that the one time domain resource meets the first preset condition indicates that there is no intersection between the one time domain resource and the time domain resource of the second selected resource in the selected resources, and the time domain spacing between the first candidate resource and the second selected resource meets the condition determined based on the carrier switching time of the terminal device.

Optionally, in some embodiments, the first preset condition specifically includes: there is an intersection between the time domain resource of the first candidate resource and the time domain resource of the first selected resource in the selected resources; and a quantity of carriers corresponding to the first selected resource is greater than or equal to a first threshold; or a sum of a quantity of carriers corresponding to the first selected resource and a quantity of carriers corresponding to a currently selected resource is greater than or equal to a second threshold; or a quantity of frequency bands corresponding to the first selected resource is greater than or equal to a third threshold; or a sum of a quantity of frequency bands corresponding to the first selected resource and a quantity of frequency bands corresponding to a currently selected resource is greater than or equal to a fourth threshold; or an amount of to-be-sent data on the first selected resource is greater than or equal to a fifth threshold; or a sum of an amount of to-be-sent data on the first selected resource and an amount of to-be-sent data on a currently selected resource is greater than or equal to a sixth threshold.

Optionally, in some embodiments, the first preset condition specifically includes: there is an intersection between the time domain resource of the first candidate resource and the time domain resource of the first selected resource in the selected resources; and a sum of a power of to-be-sent data on the first selected resource and a power of to-be-sent data on the first carrier is greater than or equal to a seventh threshold; or an absolute value of a difference between a power of to-be-sent data on at least one carrier corresponding to the first selected resource and a power of to-be-sent data on the first carrier is greater than or equal to an eighth threshold.

Optionally, in some embodiments, the first preset condition specifically includes: there is an intersection between the time domain resource of the first candidate resource and the time domain resource of the first selected resource in the selected resources; and a sum of a quantity of resource blocks occupied by to-be-sent data on the first selected resource and a quantity of resource blocks occupied by to-be-sent data on the first carrier is greater than or equal to a ninth threshold.

Optionally, in some embodiments, the first preset condition specifically includes: there is an intersection between the time domain resource of the first candidate resource and the time domain resource of the first selected resource in the selected resources; and the first carrier and at least one carrier that corresponds to the first selected resource are non-adjacent carriers; or a frequency domain spacing between the first carrier and at least one carrier that corresponds to the first selected resource is greater than or equal to a tenth threshold; or the first carrier and at least one carrier that corresponds to the first selected resource are adjacent carriers, and a frequency domain spacing between the first candidate resource and a selected resource, on the at least one carrier, on the time domain resource of the first candidate resource is greater than or equal to an eleventh threshold, and/or the frequency domain spacing between the first candidate resource and the selected resource, on the at least one carrier, on the time domain resource of the first candidate resource is less than or equal to a twelfth threshold, where the eleventh threshold is less than the twelfth threshold.

Optionally, in some embodiments, the first preset condition specifically includes: there is no intersection between the time domain resource of the first candidate resource and the time domain resource of the second selected resource in the selected resources; and when the time domain resource of the first candidate resource follows the time domain resource of the second selected resource, an interval between an end moment of the time domain resource of the second selected resource and a start moment of the time domain resource of the first candidate resource is less than or equal to a thirteenth threshold; or when the time domain resource of the first candidate resource precedes the time domain resource of the second selected resource, an interval between a start moment of the time domain resource of the second selected resource and an end moment of the time domain resource of the first candidate resource is less than or equal to a fourteenth threshold.

Optionally, in some embodiments, the preset condition includes a second preset condition, and the processing unit 1110 is specifically configured to select the resource on the first carrier from the first candidate resource subset, where the resource meets the second preset condition, where the second preset condition is that there is an intersection between a time domain resource of the resource and a time domain resource of a third selected resource in the selected resources.

Optionally, in some embodiments, the processing unit 1110 is specifically configured to: determine a second candidate resource subset from the first candidate resource subset, where each candidate resource in the second candidate resource subset meets the second preset condition; and select a resource on the first carrier from the second candidate resource subset based on one or more of the following attributes of a resource in the selected resources that corresponds to each candidate resource in the second candidate resource subset: a quantity of occupied carriers or frequency bands, an amount of to-be-sent data, a quantity of occupied resource blocks, and a priority of the to-be-sent data, where the resource in the selected resources that corresponds to each candidate resource in the second candidate resource subset indicates a resource in the selected resources that has an intersection with the candidate resource in the second candidate resource subset in terms of time domain resources.

Optionally, in some embodiments, there is no intersection between a candidate resource in the first candidate resource subset and the selected resources in terms of time domain resources, and a time domain resource of the resource selected on the first carrier is a first time domain resource; and after the processing unit 1110 selects the resource on the first carrier, before the sending unit 1120 sends the first data by using the resource selected on the first carrier, the processing unit 1110 is further configured to:

select a resource on a second carrier, where a time domain resource of the resource selected on the second carrier is a second time domain resource, and there is no intersection between the second time domain resource and the first time domain resource; and when determining that the first candidate resource subset includes a candidate resource that has an intersection with the second time domain resource in time domain, reselect a resource on the first carrier, so that there is an intersection between the resource selected on the first carrier and the second time domain resource in time domain.

Optionally, in some embodiments, there is no intersection between a candidate resource in the first candidate resource subset and the selected resources in terms of time domain resources, and a time domain resource of the resource selected on the first carrier is a first time domain resource; and after the processing unit 1110 selects the resource on the first carrier, before the sending unit 1120 sends the first data by using the resource selected on the first carrier, the processing unit 1110 is further configured to:

in a process of selecting a resource on a third carrier, determine that there is an intersection between a third time domain resource in a candidate resource set on the third carrier and a fourth time domain resource in the first candidate resource subset, where there is no intersection between the fourth time domain resource and the first time domain resource; determine a candidate resource on the third time domain resource on the third carrier as a resource selected on the third carrier; and re-determine a candidate resource on the fourth time domain resource in the first candidate resource subset as a resource selected on the first carrier.

Optionally, in some embodiments, the preset condition includes a second preset condition, and the processing unit 1110 is specifically configured to select the resource on the first carrier from the candidate resource set, where the resource meets the second preset condition, where the second preset condition is that there is an intersection between a time domain resource of the resource and a time domain resource of a fourth selected resource in the selected resources.

Optionally, in some embodiments, the processing unit 1110 is specifically configured to: determine a third candidate resource subset from the candidate resource set, where each candidate resource in the third candidate resource subset meets the second preset condition; and select a resource on the first carrier from the third candidate resource subset based on one or more of the following attributes of a resource in the selected resources that corresponds to each candidate resource in the third candidate resource subset: a quantity of occupied carriers or frequency bands, an amount of to-be-sent data, a quantity of occupied resource blocks, and a priority of the to-be-sent data, where the resource in the selected resources that corresponds to each candidate resource in the third candidate resource subset indicates a resource in the selected resources that has an intersection with the candidate resource in the third candidate resource subset in terms of time domain resources.

Figure 12:
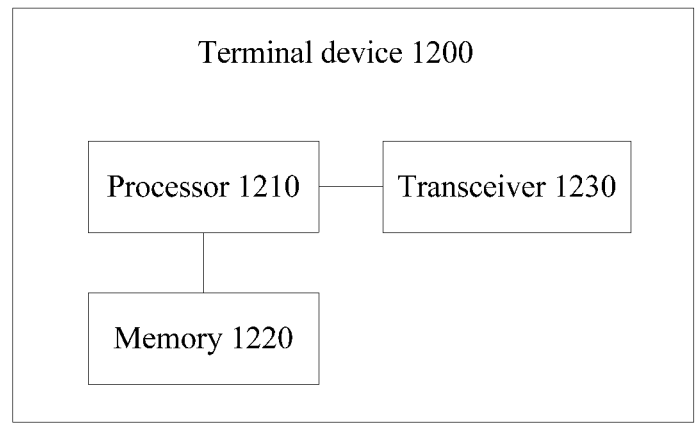
FIG. 12 is a schematic block diagram of a terminal device according to another embodiment of this application.

As shown in FIG. 12, an embodiment of this application further provides a terminal device 1200. The terminal device 1200 includes a processor 1210, a memory 1220, and a transceiver 1230. The processor 1210, the memory 1220, and the transceiver 1230 communicate with each other through an internal connection path, and transmit a control signal and/or a data signal to each other. The memory 1220 is configured to store an instruction, and the processor 1210 is configured to execute the instruction stored in the memory 1220, to control a receiver 1240 to receive a signal and control the transceiver 1230 to send or receive a signal. The processor 1210 is configured to determine a candidate resource set on a first carrier, where the first carrier is a carrier on which a resource is currently to be selected, and the first carrier is used to transmit first data. The processor 1210 is further configured to select a resource on the first carrier from the candidate resource set based on a preset condition, where the preset condition is determined based on selected resources of the terminal device on other carriers and one or more of the following information of the terminal device: a quantity of transmit chains of the terminal device, a transmit power of the terminal device, a quantity of resource blocks occupied by the terminal device, a frequency domain spacing between a plurality of carriers or a plurality of frequency domain resources occupied by the terminal device, a carrier switching time of the terminal device, and a half-duplex limitation to the terminal device, the other carriers indicate all carriers on which the terminal device has currently selected a resource, and the other carriers are used to transmit second data. The transceiver 1230 is configured to send the first data on the resource selected on the first carrier.

Optionally, in some embodiments, the preset condition includes a first preset condition, and the processor 1210 is specifically configured to: determine a first candidate resource subset from the candidate resource set, where the first candidate resource subset does not include a first candidate resource that meets the first preset condition; and select a resource on the first carrier from the first candidate resource subset, where that the first candidate resource meets the first preset condition indicates that there is an intersection between a time domain resource of the first candidate resource and a time domain resource of a first selected resource in the selected resources, and the first selected resource meets a condition determined based on one or more of the following information of the terminal device: the quantity of transmit chains of the terminal device, the transmit power of the terminal device, the quantity of resource blocks occupied by the terminal device, and the frequency domain spacing between the plurality of carriers or the plurality of frequency domain resources occupied by the terminal device; and/or that the first candidate resource meets the first preset condition indicates that there is no intersection between the time domain resource of the first candidate resource and a time domain resource of a second selected resource in the selected resources, and a time domain spacing between the first candidate resource and the second selected resource meets a condition determined based on the carrier switching time of the terminal device.

Optionally, in some embodiments, the processor 1210 is specifically configured to exclude all candidate resources on one time domain resource from the candidate resource set once the one time domain resource meets the first preset condition, to determine the first candidate resource subset, where that the one time domain resource meets the first preset condition indicates that there is an intersection between the one time domain resource and the time domain resource of the first selected resource in the selected resources, and the first selected resource meets the condition determined based on one or more of the following information of the UE: the quantity of transmit chains of the UE, the transmit power of the UE, the quantity of resource blocks occupied by the UE, and the frequency domain spacing between the plurality of carriers or the plurality of frequency domain resources occupied by the UE; and/or that the one time domain resource meets the first preset condition indicates that there is no intersection between the one time domain resource and the time domain resource of the second selected resource in the selected resources, and the time domain spacing between the first candidate resource and the second selected resource meets the condition determined based on the carrier switching time of the UE.

Optionally, in some embodiments, the first preset condition specifically includes: there is an intersection between the time domain resource of the first candidate resource and the time domain resource of the first selected resource in the selected resources; and a quantity of carriers corresponding to the first selected resource is greater than or equal to a first threshold; or a sum of a quantity of carriers corresponding to the first selected resource and a quantity of carriers corresponding to a currently selected resource is greater than or equal to a second threshold; or a quantity of frequency bands corresponding to the first selected resource is greater than or equal to a third threshold; or a sum of a quantity of frequency bands corresponding to the first selected resource and a quantity of frequency bands corresponding to a currently selected resource is greater than or equal to a fourth threshold; or an amount of to-be-sent data on the first selected resource is greater than or equal to a fifth threshold; or a sum of an amount of to-be-sent data on the first selected resource and an amount of to-be-sent data on a currently selected resource is greater than or equal to a sixth threshold.

Optionally, in some embodiments, the first preset condition specifically includes: there is an intersection between the time domain resource of the first candidate resource and the time domain resource of the first selected resource in the selected resources; and a sum of a power of to-be-sent data on the first selected resource and a power of to-be-sent data on the first carrier is greater than or equal to a seventh threshold; or an absolute value of a difference between a power of to-be-sent data on at least one carrier corresponding to the first selected resource and a power of to-be-sent data on the first carrier is greater than or equal to an eighth threshold.

Optionally, in some embodiments, the first preset condition specifically includes: there is an intersection between the time domain resource of the first candidate resource and the time domain resource of the first selected resource in the selected resources; and a sum of a quantity of resource blocks occupied by to-be-sent data on the first selected resource and a quantity of resource blocks occupied by to-be-sent data on the first carrier is greater than or equal to a ninth threshold.

Optionally, in some embodiments, the first preset condition specifically includes: there is an intersection between the time domain resource of the first candidate resource and the time domain resource of the first selected resource in the selected resources; and the first carrier and at least one carrier that corresponds to the first selected resource are non-adjacent carriers; or a frequency domain spacing between the first carrier and at least one carrier that corresponds to the first selected resource is greater than or equal to a tenth threshold; or the first carrier and at least one carrier that corresponds to the first selected resource are adjacent carriers, and a frequency domain spacing between the first candidate resource and a selected resource, on the at least one carrier, on the time domain resource of the first candidate resource is greater than or equal to an eleventh threshold, and/or the frequency domain spacing between the first candidate resource and the selected resource, on the at least one carrier, on the time domain resource of the first candidate resource is less than or equal to a twelfth threshold, where the eleventh threshold is less than the twelfth threshold.

Optionally, in some embodiments, the first preset condition specifically includes: there is no intersection between the time domain resource of the first candidate resource and the time domain resource of the second selected resource in the selected resources; and when the time domain resource of the first candidate resource follows the time domain resource of the second selected resource, an interval between an end moment of the time domain resource of the second selected resource and a start moment of the time domain resource of the first candidate resource is less than or equal to a thirteenth threshold; or when the time domain resource of the first candidate resource precedes the time domain resource of the second selected resource, an interval between a start moment of the time domain resource of the second selected resource and an end moment of the time domain resource of the first candidate resource is less than or equal to a fourteenth threshold.

Optionally, in some embodiments, the preset condition includes a second preset condition, and the processor 1210 is specifically configured to select the resource on the first carrier from the first candidate resource subset, where the resource meets the second preset condition, where the second preset condition is that there is an intersection between a time domain resource of the resource and a time domain resource of a third selected resource in the selected resources.

Optionally, in some embodiments, the processor 1210 is specifically configured to: determine a second candidate resource subset from the first candidate resource subset, where each candidate resource in the second candidate resource subset meets the second preset condition; and select a resource on the first carrier from the second candidate resource subset based on one or more of the following attributes of a resource in the selected resources that corresponds to each candidate resource in the second candidate resource subset: a quantity of occupied carriers or frequency bands, an amount of to-be-sent data, a quantity of occupied resource blocks, and a priority of the to-be-sent data, where the resource in the selected resources that corresponds to each candidate resource in the second candidate resource subset indicates a resource in the selected resources that has an intersection with the candidate resource in the second candidate resource subset in terms of time domain resources.

Optionally, in some embodiments, there is no intersection between a candidate resource in the first candidate resource subset and the selected resources in terms of time domain resources, and a time domain resource of the resource selected on the first carrier is a first time domain resource; and after the processor 1210 selects the resource on the first carrier, before the transceiver 1230 sends the first data by using the resource selected on the first carrier, the processor 1210 is further configured to:

select a resource on a second carrier, where a time domain resource of the resource selected on the second carrier is a second time domain resource, and there is no intersection between the second time domain resource and the first time domain resource; and when determining that the first candidate resource subset includes a candidate resource that has an intersection with the second time domain resource in time domain, reselect a resource on the first carrier, so that there is an intersection between the resource selected on the first carrier and the second time domain resource in time domain.

Optionally, in some embodiments, there is no intersection between a candidate resource in the first candidate resource subset and the selected resources in terms of time domain resources, and a time domain resource of the resource selected on the first carrier is a first time domain resource; and after the processor 1210 selects the resource on the first carrier, before the transceiver 1230 sends the first data by using the resource selected on the first carrier, the processor 1210 is further configured to:

in a process of selecting a resource on a third carrier, determine that there is an intersection between a third time domain resource in a candidate resource set on the third carrier and a fourth time domain resource in the first candidate resource subset, where there is no intersection between the fourth time domain resource and the first time domain resource; determine a candidate resource on the third time domain resource on the third carrier as a resource selected on the third carrier; and re-determine a candidate resource on the fourth time domain resource in the first candidate resource subset as a resource selected on the first carrier.

Optionally, in some embodiments, the preset condition includes a second preset condition, and the processor 1210 is specifically configured to select the resource on the first carrier from the candidate resource set, where the resource meets the second preset condition, where the second preset condition is that there is an intersection between a time domain resource of the resource and a time domain resource of a fourth selected resource in the selected resources.

Optionally, in some embodiments, the processor 1210 is specifically configured to: determine a third candidate resource subset from the candidate resource set, where each candidate resource in the third candidate resource subset meets the second preset condition; and select a resource on the first carrier from the third candidate resource subset based on one or more of the following attributes of a resource in the selected resources that corresponds to each candidate resource in the third candidate resource subset: a quantity of occupied carriers or frequency bands, an amount of to-be-sent data, a quantity of occupied resource blocks, and a priority of the to-be-sent data, where the resource in the selected resources that corresponds to each candidate resource in the third candidate resource subset indicates a resource in the selected resources that has an intersection with the candidate resource in the third candidate resource subset in terms of time domain resources.

An embodiment of this application further provides a chip. The chip includes a processing unit and a communications interface, the processing unit is configured to perform operations performed by the UE in the foregoing method embodiment, and the communications interface is configured to communicate with the outside.

Optionally, the chip may further include a storage unit, the storage unit stores an instruction, the processing unit is configured to execute the instruction stored in the storage unit, and when executing the instruction, the processing unit is configured to perform operations performed by the UE in the foregoing method embodiment.

An embodiment of this application further provides a computer-readable storage medium. A computer program is stored in the computer-readable storage medium, and when the computer program is executed by a terminal device, the terminal device can implement the method performed by the UE in the foregoing method embodiment.

An embodiment of this application further provides a computer program product including an instruction. When the instruction is executed by a computer, the computer can implement the method performed by the UE in the foregoing method embodiment.

It should be understood that the processor in the embodiments of the present invention may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory in the embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (e.g., a storage module) is integrated into the processor.

It should be noted that the memory described in this specification is intended to include but not limited to these memories and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation of the embodiments discussed herein. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations and embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   determining, by user equipment (UE), a candidate resource set on a first carrier, wherein the first carrier is a carrier on which a resource is currently to be selected, and the first carrier is used to transmit first data;
   selecting, by the UE, a resource on the first carrier from the candidate resource set based on a preset condition, wherein the preset condition is determined based on resources selected by the UE on other carriers and one or more of the following information of the UE: a quantity of transmit chains of the UE, a transmit power of the UE, a quantity of resource blocks occupied by the UE, a frequency domain spacing between a plurality of carriers or a plurality of frequency domain resources occupied by the UE, a carrier switching time of the UE, and a half-duplex limitation to the UE, wherein the other carriers indicate all carriers on which the UE has currently selected a resource, and the other carriers are used to transmit second data; and
   sending, by the UE, the first data on the resource selected on the first carrier, wherein the preset condition comprises a first preset condition; and
   the selecting, by the UE, the resource on the first carrier from the candidate resource set based on the preset condition comprises:
   determining, by the UE, a first candidate resource subset from the candidate resource set, wherein the first candidate resource subset does not comprise a first candidate resource that meets the first preset condition; and
   selecting, by the UE, the resource on the first carrier from the first candidate resource subset, wherein
   that the first candidate resource meets the first preset condition indicates that there is an intersection between a time domain resource of the first candidate resource and a time domain resource of a first selected resource in the selected resources, and the first selected resource meets a condition determined based on one or more of the following information of the UE: the quantity of transmit chains of the UE, the transmit power of the UE, the quantity of resource blocks occupied by the UE, and the frequency domain spacing between the plurality of carriers or the plurality of frequency domain resources occupied by the UE,
   that the first candidate resource meets the first preset condition indicates that there is no intersection between the time domain resource of the first candidate resource and a time domain resource of a second selected resource in the selected resources, and a time domain spacing between the first candidate resource and the second selected resource meets a condition determined based on the carrier switching time of the UE,
   or a combination thereof; and
   wherein the first preset condition comprises: there is an intersection between the time domain resource of the first candidate resource and the time domain resource of the first selected resource in the selected resources; and
   a quantity of carriers corresponding to the first selected resource is greater than or equal to a first threshold; or
   a sum of a quantity of carriers corresponding to the first selected resource and a quantity of carriers corresponding to a currently selected resource is greater than or equal to a second threshold; or
   a quantity of frequency bands corresponding to the first selected resource is greater than or equal to a third threshold; or
   a sum of a quantity of frequency bands corresponding to the first selected resource and a quantity of frequency bands corresponding to a currently selected resource is greater than or equal to a fourth threshold; or
   an amount of to-be-sent data on the first selected resource is greater than or equal to a fifth threshold; or
   a sum of an amount of to-be-sent data on the first selected resource and an amount of to-be-sent data on a currently selected resource is greater than or equal to a sixth threshold.

2. The communication method according to claim 1, wherein the determining, by the UE, the first candidate resource subset from the candidate resource set, wherein the first candidate resource subset does not comprise the first candidate resource that meets the first preset condition comprises:
   for each time domain resource in the candidate resource set, excluding, by the UE, all candidate resources on one time domain resource from the candidate resource set once the one time domain resource meets the first preset condition, to determine the first candidate resource subset, wherein
   that the one time domain resource meets the first preset condition indicates that there is an intersection between the one time domain resource and the time domain resource of the first selected resource in the selected resources, and the first selected resource meets the condition determined based on one or more of the following information of the UE: the quantity of transmit chains of the UE, the transmit power of the UE, the quantity of resource blocks occupied by the UE, and the frequency domain spacing between the plurality of carriers or the plurality of frequency domain resources occupied by the UE, that the one time domain resource meets the first preset condition indicates that there is no intersection between the one time domain resource and the time domain resource of the second selected resource in the selected resources, and the time domain spacing between the first candidate resource and the second selected resource meets the condition determined based on the carrier switching time of the UE, or a combination thereof.

3. The communication method according to claim 1, wherein the first preset condition comprises: there is an intersection between the time domain resource of the first candidate resource and the time domain resource of the first selected resource in the selected resources; and a sum of a power of to-be-sent data on the first selected resource and a power of to-be-sent data on the first carrier is greater than or equal to a seventh threshold; or an absolute value of a difference between a power of to-be-sent data on at least one carrier corresponding to the first selected resource and a power of to-be-sent data on the first carrier is greater than or equal to an eighth threshold.

4. The communication method according to claim 1, wherein the first preset condition comprises: there is an intersection between the time domain resource of the first candidate resource and the time domain resource of the first selected resource in the selected resources; and a sum of a quantity of resource blocks occupied by to-be-sent data on the first selected resource and a quantity of resource blocks occupied by to-be-sent data on the first carrier is greater than or equal to a ninth threshold.

5. The communication method according to claim 1, wherein the first preset condition comprises: there is an intersection between the time domain resource of the first candidate resource and the time domain resource of the first selected resource in the selected resources; and the first carrier and at least one carrier that corresponds to the first selected resource are non-adjacent carriers; or a frequency domain spacing between the first carrier and at least one carrier that corresponds to the first selected resource is greater than or equal to a tenth threshold; or the first carrier and at least one carrier that corresponds to the first selected resource are adjacent carriers, and a frequency domain spacing between the first candidate resource and a selected resource, on the at least one carrier, on the time domain resource of the first candidate resource is greater than or equal to an eleventh threshold, and/or the frequency domain spacing between the first candidate resource and the selected resource, on the at least one carrier, on the time domain resource of the first candidate resource is less than or equal to a twelfth threshold, wherein the eleventh threshold is less than the twelfth threshold.

6. The communication method according to claim 1, wherein the first preset condition comprises: there is no intersection between the time domain resource of the first candidate resource and the time domain resource of the second selected resource in the selected resources; and when the time domain resource of the first candidate resource follows the time domain resource of the second selected resource, an interval between an end moment of the time domain resource of the second selected resource and a start moment of the time domain resource of the first candidate resource is less than or equal to a thirteenth threshold; or when the time domain resource of the first candidate resource precedes the time domain resource of the second selected resource, an interval between a start moment of the time domain resource of the second selected resource and an end moment of the time domain resource of the first candidate resource is less than or equal to a fourteenth threshold.

7. The communication method according to claim 1, wherein the preset condition comprises a second preset condition; and the selecting, by the UE, the resource on the first carrier from the first candidate resource subset comprises:

selecting, by the UE, the resource on the first carrier from the first candidate resource subset, wherein the resource meets the second preset condition, wherein the second preset condition is that there is an intersection between a time domain resource of the resource and a time domain resource of a third selected resource in the selected resources.

8. The communication method according to claim 7, wherein the selecting, by the UE, the resource on the first carrier from the first candidate resource subset, wherein the resource meets the second preset condition comprises:

determining, by the UE, a second candidate resource subset from the first candidate resource subset, wherein each candidate resource in the second candidate resource subset meets the second preset condition; and selecting, by the UE, a resource on the first carrier from the second candidate resource subset based on one or more of the following attributes of a resource in the selected resources that corresponds to each candidate resource in the second candidate resource subset: a quantity of occupied carriers or frequency bands, an amount of to-be-sent data, a quantity of occupied resource blocks, and a priority of the to-be-sent data, wherein the resource in the selected resources that corresponds to each candidate resource in the second candidate resource subset indicates a resource in the selected resources that has an intersection with the candidate resource in the second candidate resource subset in terms of time domain resources.

9. A terminal device, comprising:

a processing unit configured to determine a candidate resource set on a first carrier, wherein the first carrier is a carrier on which a resource is currently to be selected, and the first carrier is used to transmit first data, wherein the processing unit is further configured to select a resource on the first carrier from the candidate resource set based on a preset condition, wherein the preset condition is determined based on selected resources of the terminal device on other carriers and one or more of the following information of the terminal device: a quantity of transmit chains of the terminal device, a transmit power of the terminal device, a quantity of resource blocks occupied by the terminal device, a frequency domain spacing between a plurality of carriers or a plurality of frequency domain resources occupied by the terminal device, a carrier switching time of the terminal device, and a half-duplex limitation to the terminal device, wherein the other carriers indicate all carriers on which the terminal device has currently selected a resource, and the other carriers are used to transmit second data; and a sending unit, configured to send the first data on the resource selected on the first carrier, wherein the preset condition comprises a first preset condition, and the processing unit is further configured to: determine a first candidate resource subset from the candidate resource set, wherein the first candidate resource subset does not comprise a first candidate resource that meets the first preset condition; and select a resource on the first carrier from the first candidate resource subset, wherein that the first candidate resource meets the first preset condition indicates that there is an intersection between a time domain resource of the first candidate resource and a time domain resource of a first selected resource in the selected resources, and the first selected resource meets a condition determined based on one or more of the following information of the terminal device: the quantity of transmit chains of the terminal device, the transmit power of the terminal device, the quantity of resource blocks occupied by the terminal device, and the frequency domain spacing between the plurality of carriers or the plurality of frequency domain resources occupied by the terminal device, that the first candidate resource meets the first preset condition indicates that there is no intersection between the time domain resource of the first candidate resource and a time domain resource of a second selected resource in the selected resources, and a time domain spacing between the first candidate resource and the second selected resource meets a condition determined based on the carrier switching time of the terminal device, or a combination thereof; and wherein the first preset condition comprises: there is an intersection between the time domain resource of the first candidate resource and the time domain resource of the first selected resource in the selected resources; and a quantity of carriers corresponding to the first selected resource is greater than or equal to a first threshold; or a sum of a quantity of carriers corresponding to the first selected resource and a quantity of carriers corresponding to a currently selected resource is greater than or equal to a second threshold; or a quantity of frequency bands corresponding to the first selected resource is greater than or equal to a third threshold; or a sum of a quantity of frequency bands corresponding to the first selected resource and a quantity of frequency bands corresponding to a currently selected resource is greater than or equal to a fourth threshold; or an amount of to-be-sent data on the first selected resource is greater than or equal to a fifth threshold; or a sum of an amount of to-be-sent data on the first selected resource and an amount of to-be-sent data on a currently selected resource is greater than or equal to a sixth threshold.

10. The terminal device according to claim 9, wherein the processing unit is further configured to exclude all candidate resources on one time domain resource from the candidate resource set once the one time domain resource meets the first preset condition, to determine the first candidate resource subset, wherein that the one time domain resource meets the first preset condition indicates that there is an intersection between the one time domain resource and the time domain resource of the first selected resource in the selected resources, and the first selected resource meets the condition determined based on one or more of the following information of the UE: the quantity of transmit chains of the UE, the transmit power of the UE, the quantity of resource blocks occupied by the UE, and the frequency domain spacing between the plurality of carriers or the plurality of frequency domain resources occupied by the UE, that the one time domain resource meets the first preset condition indicates that there is no intersection between the one time domain resource and the time domain resource of the second selected resource in the selected resources, and the time domain spacing between the first candidate resource and the second selected resource meets the condition determined based on the carrier switching time of the UE, or a combination thereof.

11. The terminal device according to claim 9, wherein the first preset condition comprises: there is an intersection between the time domain resource of the first candidate resource and the time domain resource of the first selected resource in the selected resources; and a sum of a power of to-be-sent data on the first selected resource and a power of to-be-sent data on the first carrier is greater than or equal to a seventh threshold; or an absolute value of a difference between a power of to-be-sent data on at least one carrier corresponding to the first selected resource and a power of to-be-sent data on the first carrier is greater than or equal to an eighth threshold.

12. The terminal device according to claim 9, wherein the first preset condition comprises: there is an intersection between the time domain resource of the first candidate resource and the time domain resource of the first selected resource in the selected resources; and a sum of a quantity of resource blocks occupied by to-be-sent data on the first selected resource and a quantity of resource blocks occupied by to-be-sent data on the first carrier is greater than or equal to a ninth threshold.

13. The terminal device according to claim 9, wherein the first preset condition comprises: there is an intersection between the time domain resource of the first candidate resource and the time domain resource of the first selected resource in the selected resources; and the first carrier and at least one carrier that corresponds to the first selected resource are non-adjacent carriers; or a frequency domain spacing between the first carrier and at least one carrier that corresponds to the first selected resource is greater than or equal to a tenth threshold; or the first carrier and at least one carrier that corresponds to the first selected resource are adjacent carriers, and a frequency domain spacing between the first candidate resource and a selected resource, on the at least one carrier, on the time domain resource of the first candidate resource is greater than or equal to an eleventh threshold, and/or the frequency domain spacing between the first candidate resource and the selected resource, on the at least one carrier, on the time domain resource of the first candidate resource is less than or equal to a twelfth threshold, wherein the eleventh threshold is less than the twelfth threshold.

14. The terminal device according to claim 9, wherein the first preset condition comprises: there is no intersection between the time domain resource of the first candidate resource and the time domain resource of the second selected resource in the selected resources; and when the time domain resource of the first candidate resource follows the time domain resource of the second selected resource, an interval between an end moment of the time domain resource of the second selected resource and a start moment of the time domain resource of the first candidate resource is less than or equal to a thirteenth threshold; or when the time domain resource of the first candidate resource precedes the time domain resource of the second selected resource, an interval between a start moment of the time domain resource of the second selected resource and an end moment of the time domain resource of the first candidate resource is less than or equal to a fourteenth threshold.

15. The terminal device according to claim 9, wherein the preset condition comprises a second preset condition, and the processing unit is further configured to select the resource on the first carrier from the first candidate resource subset, wherein the resource meets the second preset condition, wherein the second preset condition is that there is an intersection between a time domain resource of the resource and a time domain resource of a third selected resource in the selected resources.

16. The terminal device according to claim 15, wherein the processing unit is further configured to: determine a second candidate resource subset from the first candidate resource subset, wherein each candidate resource in the second candidate resource subset meets the second preset condition; and select a resource on the first carrier from the second candidate resource subset based on one or more of the following attributes of a resource in the selected resources that corresponds to each candidate resource in the second candidate resource subset: a quantity of occupied carriers or frequency bands, an amount of to-be-sent data, a quantity of occupied resource blocks, and a priority of the to-be-sent data, wherein the resource in the selected resources that corresponds to each candidate resource in the second candidate resource subset indicates a resource in the selected resources that has an intersection with the candidate resource in the second candidate resource subset in terms of time domain resources.

* * * * *